United States Patent
Taylor et al.

(10) Patent No.: US 7,281,170 B2
(45) Date of Patent: Oct. 9, 2007

(54) HELP DESK SYSTEMS AND METHODS FOR USE WITH COMMUNICATIONS NETWORKS

(75) Inventors: David T. Taylor, Durham, NH (US); Jonathan P. Caron, Nottingham, NH (US); Patrick A. Bosa, Exeter, NH (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/282,872

(22) Filed: Oct. 29, 2002

(65) Prior Publication Data
US 2003/0056140 A1 Mar. 20, 2003

Related U.S. Application Data

(63) Continuation of application No. PCT/US01/14766, filed on May 7, 2001.

(60) Provisional application No. 60/202,300, filed on May 5, 2000, provisional application No. 60/202,299, filed on May 5, 2000, provisional application No. 60/202,296, filed on May 5, 2000.

(51) Int. Cl.
*G06F 11/00* (2006.01)
(52) U.S. Cl. .................................................... 714/48
(58) Field of Classification Search .............. 714/27, 714/48; 709/1
See application file for complete search history.

(56) References Cited

U.S. PATENT DOCUMENTS

| | | | |
|---|---|---|---|
| 4,827,411 A | 5/1989 | Arrowood et al. | 707/206 |
| 5,127,005 A | 6/1992 | Oda et al. | 714/26 |
| 5,159,685 A | 10/1992 | Kung | 395/575 |
| 5,261,044 A | 11/1993 | Dev et al. | 395/159 |
| 5,295,244 A | 3/1994 | Dev et al. | 395/161 |
| 5,297,138 A | 3/1994 | Black | 370/254 |
| 5,317,725 A * | 5/1994 | Smith et al. | 714/27 |
| 5,367,667 A | 11/1994 | Wahlquist et al. | 395/575 |
| 5,377,196 A * | 12/1994 | Godlew et al. | 714/712 |
| 5,436,909 A | 7/1995 | Dev et al. | 371/20.1 |
| 5,521,910 A | 5/1996 | Matthews | 370/54 |
| 5,539,877 A | 7/1996 | Winokur et al. | 714/26 |
| 5,559,955 A | 9/1996 | Dev et al. | 395/182.02 |
| 5,568,491 A | 10/1996 | Beal et al. | 714/746 |
| 5,590,120 A | 12/1996 | Vaishnavi et al. | 370/254 |
| 5,608,874 A | 3/1997 | Ogawa et al. | 395/200.15 |
| 5,627,819 A | 5/1997 | Dev | 370/250 |
| 5,649,103 A | 7/1997 | Datta et al. | 395/200.03 |

(Continued)

OTHER PUBLICATIONS

Peregrine Systems partners with Motive Communications to Offer IT solutions that enhance employee self-service, 1999, Peregrine Systems, Inc.*

(Continued)

*Primary Examiner*—Michael Maskulinski
(74) *Attorney, Agent, or Firm*—Pillsbury Winthrop Shaw Pittman, LLP

(57) ABSTRACT

A network management system includes a fault diagnosis system, a topology mapper, an impact analyzer and a help desk system. The a help desk system includes a user interaction module, and a fault diagnosis interaction module. The user interaction module is constructed and arranged to automatically communicate with a user. The fault diagnosis interaction module is constructed and arranged to communicate with a fault diagnosis system.

39 Claims, 14 Drawing Sheets

U.S. PATENT DOCUMENTS

| | | | |
|---|---|---|---|
| 5,666,481 A | 9/1997 | Lewis | 395/182.02 |
| 5,675,741 A | 10/1997 | Aggarwal | 395/200.12 |
| 5,684,800 A | 11/1997 | Dobbins et al. | 370/401 |
| 5,687,290 A | 11/1997 | Lewis | 395/3 |
| 5,691,917 A | 11/1997 | Harrison | 717/6 |
| 5,696,486 A * | 12/1997 | Poliquin et al. | 340/506 |
| 5,706,436 A | 1/1998 | Lewis et al. | 395/200.11 |
| 5,727,157 A | 3/1998 | Orr | 395/20.54 |
| 5,729,685 A | 3/1998 | Chatwani et al. | 709/224 |
| 5,734,642 A | 3/1998 | Vaishnavi et al. | 370/255 |
| 5,734,824 A | 3/1998 | Choi | 395/200.11 |
| 5,748,781 A | 5/1998 | Datta et al. | 382/232 |
| 5,751,965 A | 5/1998 | Mayo et al. | 395/200.54 |
| 5,751,967 A | 5/1998 | Raab et al. | 709/228 |
| 5,768,501 A | 6/1998 | Lewis | 395/185.01 |
| 5,777,549 A | 7/1998 | Arrowsmith et al. | 340/506 |
| 5,787,234 A * | 7/1998 | Molloy | 706/46 |
| 5,793,362 A | 8/1998 | Matthews et al. | 395/200.54 |
| 5,809,282 A | 9/1998 | Cooper et al. | 709/226 |
| 5,822,302 A | 10/1998 | Scheetz et al. | 370/245 |
| 5,832,503 A | 11/1998 | Malik et al. | 707/104 |
| 5,850,397 A | 12/1998 | Raab et al. | 370/392 |
| 5,864,662 A | 1/1999 | Brownmiller et al. | 714/43 |
| 5,872,911 A * | 2/1999 | Berg | 714/43 |
| 5,889,953 A | 3/1999 | Thebaut et al. | 395/200.51 |
| 5,907,696 A | 5/1999 | Stilwell et al. | 395/500 |
| 5,926,463 A | 7/1999 | Ahearn et al. | 370/254 |
| 5,951,649 A | 9/1999 | Dobbins et al. | 709/238 |
| 5,987,442 A | 11/1999 | Lewis et al. | 706/10 |
| 6,000,045 A * | 12/1999 | Lewis | 714/47 |
| 6,003,090 A | 12/1999 | Puranik et al. | 709/235 |
| 6,006,016 A | 12/1999 | Faigon et al. | 714/48 |
| 6,009,440 A | 12/1999 | Watson et al. | 707/203 |
| 6,012,152 A * | 1/2000 | Douik et al. | 714/26 |
| 6,014,697 A | 1/2000 | Lewis et al. | 709/223 |
| 6,026,442 A | 2/2000 | Lewis et al. | 709/229 |
| 6,026,500 A * | 2/2000 | Topff et al. | 714/26 |
| 6,032,184 A * | 2/2000 | Cogger et al. | 709/223 |
| 6,041,383 A | 3/2000 | Jeffords et al. | 710/200 |
| 6,049,828 A * | 4/2000 | Dev et al. | 709/224 |
| 6,055,561 A | 4/2000 | Feldman et al. | 709/200 |
| 6,064,304 A | 5/2000 | Arrowsmith et al. | 340/506 |
| 6,069,895 A | 5/2000 | Ayandeh | 370/399 |
| 6,072,777 A | 6/2000 | Bencheck et al. | 370/244 |
| 6,079,020 A | 6/2000 | Liu | 713/201 |
| 6,084,858 A | 7/2000 | Matthews et al. | 370/238 |
| 6,101,180 A | 8/2000 | Donahue et al. | 370/352 |
| 6,101,500 A | 8/2000 | Lau | 707/103 |
| 6,112,251 A | 8/2000 | Rijhsinghani | 709/249 |
| 6,115,362 A | 9/2000 | Bosa et al. | 370/248 |
| 6,131,112 A | 10/2000 | Lewis et al. | 709/207 |
| 6,141,720 A | 10/2000 | Jeffords et al. | 710/200 |
| 6,141,777 A * | 10/2000 | Cutrell et al. | 714/47 |
| 6,147,995 A | 11/2000 | Dobbins et al. | 370/392 |
| 6,158,011 A | 12/2000 | Chen et al. | 713/201 |
| 6,173,399 B1 | 1/2001 | Gilbrech | 713/153 |
| 6,185,619 B1 | 2/2001 | Joffe et al. | 709/229 |
| 6,195,349 B1 | 2/2001 | Hiscock et al. | 370/360 |
| 6,199,172 B1 | 3/2001 | Dube et al. | 714/4 |
| 6,205,488 B1 | 3/2001 | Casey et al. | 709/238 |
| 6,205,563 B1 | 3/2001 | Lewis | 714/47 |
| 6,208,649 B1 | 3/2001 | Kloth | 370/392 |
| 6,216,168 B1 | 4/2001 | Dev et al. | 709/245 |
| 6,230,194 B1 * | 5/2001 | Frailong et al. | 709/220 |
| 6,233,623 B1 | 5/2001 | Jeffords et al. | 709/316 |
| 6,252,852 B1 * | 6/2001 | Rowles et al. | 370/242 |
| 6,296,330 B1 | 10/2001 | Hall | 305/180 |
| 6,324,590 B1 | 11/2001 | Jeffords et al. | 709/316 |
| 6,338,092 B1 | 1/2002 | Chao et al. | 709/236 |
| 6,345,239 B1 * | 2/2002 | Bowman-Amuah | 703/6 |
| 6,349,306 B1 | 2/2002 | Malik et al. | 707/103 |
| 6,377,987 B1 | 4/2002 | Kracht | 709/220 |
| 6,392,667 B1 | 5/2002 | McKinnon et al. | 345/738 |
| 6,393,386 B1 | 5/2002 | Zager et al. | 703/25 |
| 6,408,312 B1 | 6/2002 | Forthman et al. | 707/203 |
| 6,421,719 B1 | 7/2002 | Lewis et al. | 709/224 |
| 6,580,693 B1 | 6/2003 | Chernyak et al. | 370/248 |
| 6,581,166 B1 | 6/2003 | Hirst et al. | 714/4 |
| 6,604,208 B1 | 8/2003 | Gosselin et al. | 714/4 |
| 6,654,914 B1 | 11/2003 | Kaffine et al. | 714/43 |
| 6,694,314 B1 * | 2/2004 | Sullivan et al. | 707/10 |
| 6,876,993 B2 * | 4/2005 | LaButte et al. | 706/47 |
| 7,043,661 B2 | 5/2006 | Valadarsky et al. | 714/4 |
| 7,103,807 B2 | 9/2006 | Bosa et al. | 714/43 |
| 7,111,205 B1 * | 9/2006 | Jahn et al. | 714/47 |
| 2002/0133328 A1 * | 9/2002 | Bowman-Amuah | 703/22 |
| 2002/0133756 A1 | 9/2002 | Jain | 714/43 |
| 2003/0069972 A1 | 4/2003 | Yoshimura et al. | 709/226 |
| 2003/0149919 A1 * | 8/2003 | Greenwald et al. | 714/43 |
| 2004/0078683 A1 * | 4/2004 | Buia et al. | 714/37 |

OTHER PUBLICATIONS

International Search Report issued in PCT/US01/14766 dated Aug. 2, 2001.

Harry Newton, Newton's Telecom Dictionary, 2004, CMP Books, Twentieth Edition, p. 491.

Microsoft Computer Dictionary, 2002, Microsoft Press, Fifth Edition, p. 291.

* cited by examiner

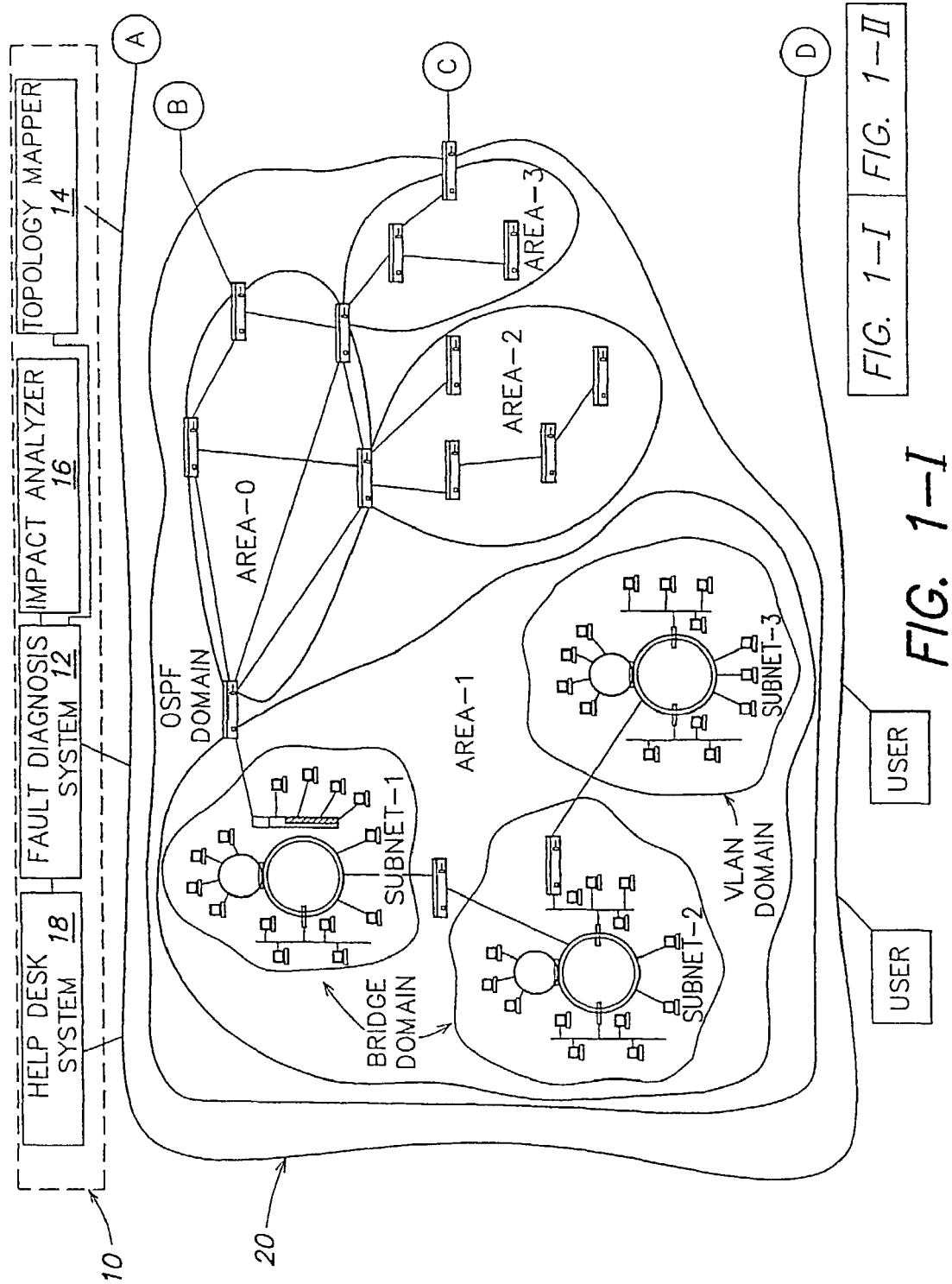
FIG. 1-I

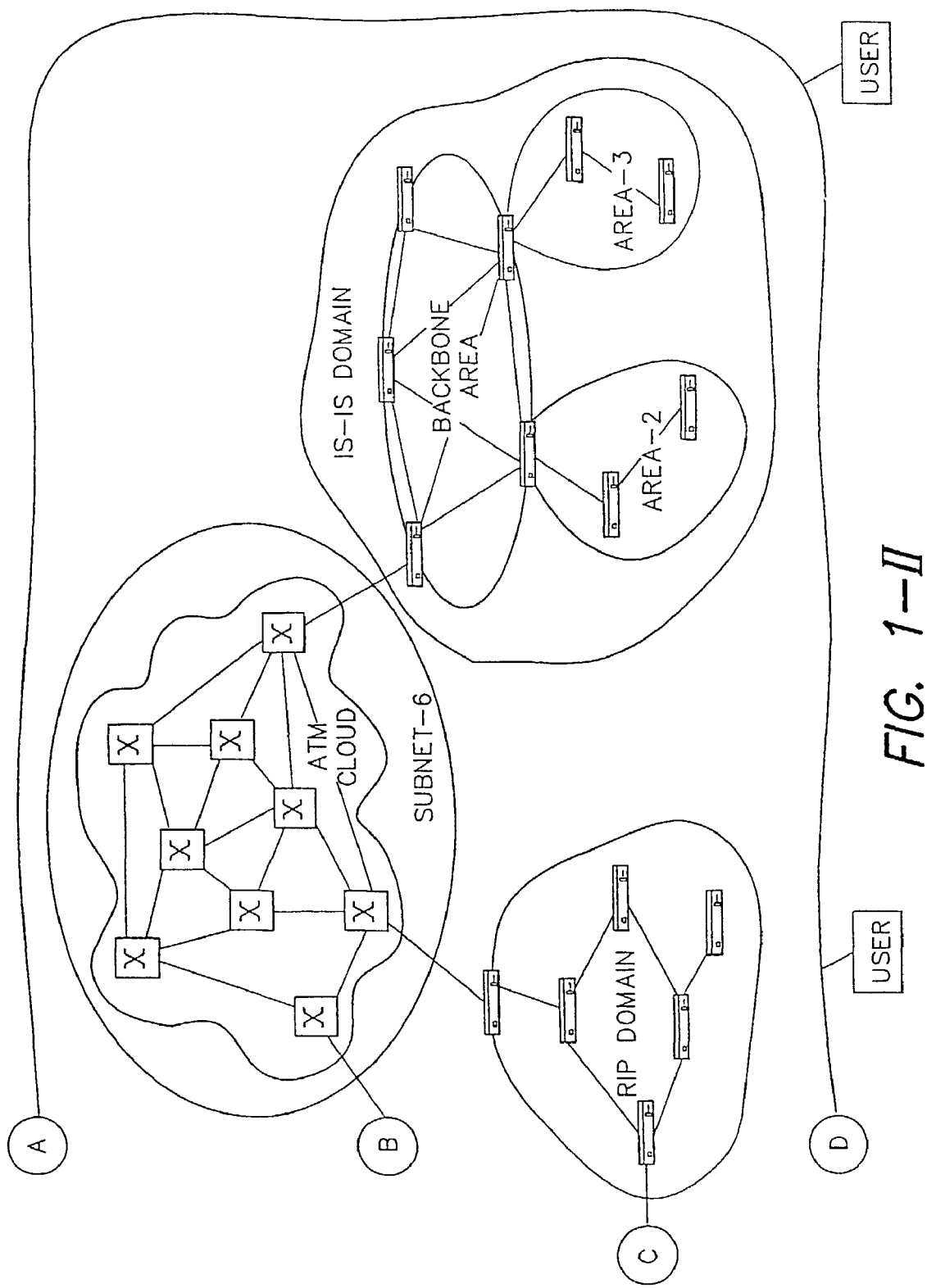
FIG. 1-II

HELP DESK SYSTEMS AND METHODS FOR USE WITH COMMUNICATIONS NETWORKS

This application is a continuation of PCT Application PCT/US 01/14766, filed May 7, 2001 which claims priority from U.S. Provisional Application No. 60/202,300, filed on May 5, 2000, entitled "User Centric Help Desk System with Integration to topologically aware Fault Diagnosis Engine," and claims priority from U.S. Provisional Application No. 60/202,296, entitled "Construction of a Very Rich, Multilayer Topological Model of a Computer Network for Purposes of Fault Diagnosis," filed on May 5, 2000, and claims priority from U.S. Provisional Application No. 60/202,299, entitled "A method for diagnosing faults in large multiplayer environments guided by path and dependency analysis of the modeled system," filed on May 5, 2000, all of which are incorporated by reference in their entireties.

GENERAL DESCRIPTION

The present invention relates a network management system, and more particularly to a network management system designed to interact automatically with a help desk system.

The construction of computer networks started on a large scale in the 1970's. Computer networks link personal computers, workstations, servers, storage devices, printers and other devices. Historically, wide area computer networks (WANs) have enabled communications across large geographic areas, and local area networks (LANs) communications at individual locations. Both WANs and LANs have enabled sharing of network applications such as electronic mail, file transfer, host access and shared databases. Furthermore, WANs and LANs have enabled efficient transfer of information, and sharing of resources, which in turn increased user productivity. Clearly, communications networks have become vitally important for businesses and individuals.

Communications networks usually transmit digital data in frames or packets created according to predefined protocols that define their format. Data frames include headers (located at the beginning and containing addresses), footers (located at the end of the frames), and data fields that include the transmitted data bits (payload). Data frames may have a fixed or variable length according to the used protocol or network type.

A communications network transmits data from one end station (i.e., a computer, workstation, server etc.) to another using a hierarchy of protocol layers (i.e., layers that are hierarchically stacked). In the communication process, each layer in the source communicates with the corresponding layer in the destination in accordance with a protocol defining the rules of communication. This is actually achieved by transferring information down from one layer to another across the layer stack, transmitting across a communication medium, and then transferring information back up the successive protocol layers on the other end. To facilitate better understanding, however, one can visualize a protocol layer communicating with its counterparts at the same layer level.

The open system interconnection (OSI) model has seven layers that define the rules for transferring information between the stations. A physical layer (Layer 1) is responsible for the transmission of bit streams across a particular physical transmission medium. This layer involves a connection between two endpoints allowing electrical signals to be exchanged between them.

A data link layer (Layer 2) is responsible for moving information across a particular link by packaging raw bits into logically structured packets or frames. Layer 2 ensures good transmission and correct delivery by checking errors, re-transmitting as necessary, and attaching appropriate addresses to the data sent across a physical medium. If a destination computer does not send an acknowledgment of frame receipt, Layer 2 resends the frame. The contention access methods (e.g., CSMA/CD, and Token Passing) are regarded as Layer 2 activities. Layer 2 may be further divided into two sub-layers: Logical Link Control (LLC) and Media Access Control (MAC). The MAC sublayer defines procedures the stations must follow to share the link and controls access to the transmission link in an orderly manner. The MAC sublayer defines a hardware or data link address called a MAC address. The MAC address is unique for each station so that multiple stations can share the same medium and still uniquely identify each other. The LLC sublayer manages communications between devices over a single link of the communications network.

A network layer (Layer 3) is set up to route data from one network user to another. Layer 3 is responsible for establishing, maintaining, and terminating the network connection between two users and for transferring data along that connection. Layer 3 addresses, messages, and determines the route along the network from the source to the destination computer. Layer 3 manages traffic, such as switching, routing, and controlling the congestion of data transmissions.

A transport layer (Layer 4) is responsible for providing data transfer between two users at an agreed level of quality. When a connection is established, this layer is responsible for selecting a particular quality of service (QoS), for monitoring transmissions to ensure the selected QoS, and for notifying the users if the QoS deteriorates. Layer 4 also provides for error recognition and recovery, repackaging of long messages into smaller frames of information, and acknowledgments of receipt.

A session layer (Layer 5) focuses on providing services used to organize communication and synchronize the dialog that takes place between users and to manage the data exchange. The primary concern of Layer 5 is controlling when users can send and receive concurrently or alternately. A presentation layer (Layer 6) is responsible for the presentation of information in a way that is meaningful to network users. This may include character code transmission, data conversion, or data compression and expansion.

Layer 6 translates data from both Layer 5 and from Layer 7 into an intermediate format and provides data encryption and compression services. Layer 7 is an application layer that provides means for application processes to access the system interconnection facilities in order to exchange information. This includes services used to establish and terminate the connections between users and to monitor and manage the systems being interconnected, as well as the various resources they employ.

As data is passed down through the layers, each layer may or may not add protocol information to the data, for example, by encapsulating frames with a header or removing the header, depending on the direction in the protocol stack. The individual protocols define the format of the headers.

MAC address includes a source address and a destination address, which have a predefined relationship to a network station. Higher network layers provide a network address that has a logical relationship established by a network administrator according to a predetermined network addressing arrangement. The assigned network address conveys information that can be used by a router when routing frames through the internetwork. If the network address is hierarchical, a router may use a portion of the address to route the packet to a higher-level partition or domain in the internetwork. Some protocols are hierarchical others are not so hierarchical routing may or may not be available.

The global network may be subdivided into IP networks, which in turn may be subdivided into subnets. An IP address includes a network number (assigned by IANA), a subnet number (assigned by a network administrator), and a host that identifies an end station. The host number may be assigned by a network administrator, or may be assigned dynamically. This is a form of hierarchical addressing that is used by IP routing algorithms to perform hierarchical or prefix routing operations. Routing algorithms maintain information of all higher-level routing environments in routing tables for domains by recording their shortest unique address prefixes.

A station may support more than one network layer protocol. Such station has multiple network addresses and multiple protocol stacks that present the same MAC address on a port for the different protocols. Thus, a multi-protocol stack station connected to both an IP and an IPX network includes an IP network address and an IPX network address.

A communications network may include a number of network entities (or nodes), a number of interconnecting links and communication devices. A network node is, for example, a personal computer, a network printer, file server or the like. An interconnecting link is, for example, an Ethernet, Token-Ring or other type network link. Communication devices include routers, switches, bridges or their equivalents. As computer networks have grown in size, network management systems that facilitate the management of network entities, communication links and communication devices have become necessary tools for a network administrator.

A bridge or a switch is a Layer 2 entity that is typically a computer with a plurality of ports for establishing connections to other entities. The bridging function includes receiving data from a port and transferring that data to other ports for receipt by other entities. A bridge moves data frames from one port to another using the end-station MAC address information contained in the switched frames. Switches interconnect the communication media to form small domains of stations, such as a subnetwork. Subnetworks or subnets provide an organizational overlay to an internetwork that facilitates transmission of data between the end stations, particularly for broadcast transmissions. The subnet functions to limit the proliferation of broadcast frames to stations within a broadcast domain.

A router is an intermediate station that interconnects domains or subnets by providing path from a node on a first network to a node on a second network. There are single protocol or multi-protocol routers, central or peripheral routers, and LAN or WAN routers. A peripheral router connects a network to a larger internetwork, and thus may be limited to a single protocol. A central router may be connected to a different board in a server or a hub and thus usually has a multi-protocol capability.

A router provides the path by first determining a route and then providing an initial connection for the path. A router executes network routing software that depends on the used protocol. A router can work with different data-link layer protocols and thus can connect networks using different architectures, for example, Ethernet to Token Ring to FDDI. Furthermore, there are routers of several levels, wherein, for example, a subnetwork router can communicate with a network router. Organizing a communications network into levels simplifies the routing tasks since a router needs to find only the level it must deal with. The use of different network levels is shown in FIG. 1.

In general, a global communications network connects devices separated by hundreds of kilometers. A LAN covers a limited area of maximum several kilometers in radius connecting devices in the same building or in a group of buildings. LANs usually include bridges or switches connecting several end-stations and a server. In a LAN, a bridge or a switch broadcasts traffic to all stations. Until a few years ago, a LAN was user-owned (did not run over leased lines) with gateways to public or other private networks. When a user moved or changed to an end-station at another location on the network, a network administrator had to rewire and reconfigure the user's station. This has changed with the introduction of virtual LANs.

A virtual LAN (VLAN) is a logical Layer 2 broadcast domain, which enables a logical segmentation of the network without changing the physical connections. A VLAN enabled switch segments the connected stations into logically defined groups. Broadcast traffic from a server or an end-stations in a particular VLAN is replicated only on those ports connected to end-stations belonging to that VLAN. The broadcast traffic is blocked from ports with no endpoints belonging to that VLAN, creating a similar type of broadcast containment that routers provide. VLANs may also be defined between different domains connected by a router. In this case, the router passes network traffic from one domain to the other (as done without defining a VLAN), and passes network traffic from one VLAN to the other. The router also passes network traffic between VLANs that are in the same domain because VLANs do not normally share user information. The router is configured as a member of all VLANs.

A global communications network may use a different levels different routing and connection management protocols such as International Standards Organization (ISO) Open Systems Interface (OSI) Intermediate Systems to Intermediate Systems (IS-IS), and Internet Open Shortest Path First (OSPF) protocols are used for connectionless routing of data frames. A synchronous Transfer Mode (ATM) Forum Private Network-Network-Interface (PNNI) protocol is used for connection oriented multi-media services. The routing protocols identify a network node using a global address of a Route Server Element (RSE). The RSEs generate routing that identify optimal routes for communication throughout the network. The RSE is responsible for administration of the algorithms that enable a node to keep its view of the network topology and performance metric current, referred to as Routing Information Exchange (RIE). Thus an RSE usually acts as a central element for the routing of traffic through the node.

In general, the use of WANs, LANs, VPNs, and VLANs has increased the number and complexity of communications networks. These networks continuously evolve and change due to growth and introduction of new interconnections, topologies, protocols, or applications. Furthermore, most networks have redundant communication paths to prevent portions of the network from being isolated due to link failures. Also, multiple paths can be used simultaneously to load-balance data between the paths. However, redundant paths can also introduce problems such as formation of loops. Furthermore, network performance can degrade due to improper network configurations, inefficient or incorrect routing, redundant network traffic or other problems. Network hardware and software systems may also contain design flaws that affect network performance or limit access by users to certain of the resources on the network. These factors make network management complex and difficult.

A network management process controls and optimizes the efficiency and productivity of a communications network. A network management station manages the network entities (e.g., routers bridges switches, servers, storage devices, computers, printers) using a network management protocol such as a Simple Network Management Protocol (SNMP), Internet Control Message Protocol (ICMP), or another network management protocol known in the art. Using a network management protocol, the network management station can deliver information or receive information by actively polling the network entities or by receiving unsolicited information from the network entities. Using SNMP, a network management station can executes a set, get, or get-next functions to sett and retrieve information from a network entity. This information may be stored within the polled network entity as Management Information Base (MIB). The network management station can receive unsolicited information from a network entity in the form of an SNMP trap. Network entities may send SNMP traps to the network management station when a problem in the network or network entity occurs.

A network management station may be implemented using any general purpose computer system, which is programmable using a high-level computer programming language or using specially programmed, special purpose hardware. The hardware includes a processor executing an operating system providing a platform for computer programs that run scheduling, debugging, input-output control, accounting compilation, storage assignment, data management, memory management, and communication control and other services. The application programs are written in high level programming languages.

A network management station can include a network manager unit, a network communication interface, a data acquisition unit, a data correlation unit, and a graphical user interface. The data correlation unit interprets data received through the data acquisition unit and presents the interpreted data to a user on the graphical user interface. The network communication interface may include transport protocols and LAN drivers used to communicate information to the communications network. The transport protocols may be IPX, TCP/IP or other well-known transport protocols. The LAN drivers may include software required to transmit data on a communications network through the network interface. The LAN drivers are generally provided by the manufacturer of the network interface for a general purpose computer for the purpose of communicating through the network interface. The network manager unit may be an SNMP network manager/agent implementing SNMP functions, or another type of network manager unit performing associated management functions. The network manager unit utilizes the network communication interface to transfer requests to network entities over a communications network.

A network management station may use a network management agent residing on a network entity. The network management agent may be a software process running on a processor or may be special purpose hardware. The network management agent may be an SNMP agent (or ICMP agent?), which may include a data collection unit, a network manager unit, and a network communication interface for communication as described above. For example, this communication may use network management functions such as SNMP functions Alternatively, a network management agent, residing on a network entity, may include a data correlation unit, a data collection unit, a network manager unit and a network communication interface for communication.

In the network management station, the data correlation unit interprets data received through data acquisition unit. The data correlation unit may include an interface processor, a state processor, a hierarchical database, and one or more sets of object rules. The interface processor communicates with graphic libraries residing in the graphical user interface to present interpreted data to a user. The interface processor performs graphic functions associated with objects related to a network map or model. The graphic functions generate visual notifications to a user. The state processor performs correlation functions of the data correlation unit by requesting and receiving network management information from the data acquisition unit. The data acquisition unit stores data and requests information from the network manager. In the network agent, the data correlation unit interprets data received by data collection unit. The state processor performs correlation functions of the data correlation unit by requesting and receiving network management information from the data collection unit. The data collection unit stores data and requests information from the network manager. In the network agent, the data collection unit can collect data from the network entity directly through its own network manager. The data collection and acquisition units can invoke network management commands within network manager libraries, which send and retrieve information from a network entity. These commands may be SNMP functions mentioned above, or ICMP functions. The state processor interprets data received from the network manager libraries in accordance with object rules. The object rules define how the state processor combines or parameterizes different properties of a network entity. The state processor can produce parameterized properties from the object rules The interaction between the users of a computer network and the help desk system is done by the proxy of a help desk operator or system administrator. Typically, the user experiencing a disruptive event will contact the help desk operator via phone or e-mail to report the problem. The help desk operator will then interact with the help desk software on behalf of the user. Once the event has been entered, the user originating the event has no visibility into the status or process of problem resolution. His only recourse is to contact the help desk operator repeatedly to inquire about the status.

In a production environment, where the help desk operator must facilitate the resolution of disruptive events in volume, and where network users who experience these disruptive events are anxious to learn the status of the repair, this system has inherent disadvantages. The help desk operator is distracted by calls from users requesting the status of previously reported events, and the user is generally ignorant of the current status of the network and the problems that have been reported unless they too call the help desk.

The help desk operator is also responsible for performing basic triage to determine the extent of the impact and assign the problem to a trouble-shooter. This takes time and can be interrupted frequently by other calls from users.

SUMMARY OF THE INVENTION

The present invention is a system, a method and a product (that can be stored in a computer-readable storage medium) for diagnosing or analyzing faults of various types (including a complete or partial failure).

According to one aspect, a method or a help desk system includes a user interaction module and a fault diagnosis interaction module. The user interaction module is constructed and arranged to automatically communicate with a user. The fault diagnosis interaction module is constructed and arranged to communicate with a fault diagnosis system.

According to another aspect, a help desk system includes means for communicating fault information with a user, and means for communicating the fault information with a fault diagnosis system.

Preferred embodiments include one or more of the following:

The user interaction module is further constructed to receive fault information from the user and automatically provide the fault information to the fault interaction system.

The user interaction module is further constructed to receive fault data information from the fault diagnosis system and notify the user about the corresponding fault.

The help desk system further includes a help desk notification module constructed and arranged to receive the information from the fault diagnosis system and provide the information to other users. The help desk system further includes a fault impact notification module constructed and arranged to receive fault data from the fault diagnosis interaction module and provide impact notification. The help desk system further includes a group administrator module. The help desk system further includes group membership data base files. The help desk system further includes a data base memory. The help desk system further includes a network administrator interaction module constructed and arranged to communicate with a network administrator. The help desk system further includes a user, group service association module.

A network management system may include a fault diagnosis system, a topology mapper, an impact analyzer and a help desk system. The a help desk system includes a user interaction module, and a fault diagnosis interaction module. The user interaction module is constructed and arranged to automatically communicate with a user. The fault diagnosis interaction module is constructed and arranged to communicate with a fault diagnosis system.

Computer networks provide data transport between computer users and services. These computer networks are generally complex and frail causing service disruptions to users. A user detecting a service disruption will report the disruption to the help desk either via web-based intranet, phone key pad, or other mechanism. The help desk creates a fault in an integrated fault diagnosis engine, and keeps the affected users informed on the status of this fault. The help desk also informs the network administrator of the diagnostic steps the fault diagnosis engine has taken to diagnose the root cause. The help desk can use stored associations between users and faults to automatically send impacted users information about current or planned service disruptions.

The invention may be implemented in any of many structured programming languages, and could probably be implemented in a neural network system. The interface between the user and the help desk could be a voice command recognition system, a telephone tone recognition system, or any standard or proprietary communication protocol between the user (or a system running on behalf of the user) and the help desk.

The mechanism of sending unsolicited messages to users may take the form of a ticker-tape like application with filtering capabilities. This ticker-tape could display the current conditions of the network when no help desk messages intended for the user are present. When the help desk sends a message intended for the user, the ticker-tape would display those messages either in a random order or in order of some priority scheme.

The help desk system is designed to manage assignment of tasks related to solving various problems that may be experienced by a computer system. Further applications may track the progress of diagnosis and repair of reported events, and may log and report on previously entered events.

The interface between the help desk and the fault diagnosis system could be implemented using any standard or proprietary interprocess communication protocol, including, but not limited to RMI, COM, or DCOM.

BRIEF DESCRIPTION OF THE DRAWINGS

FIG. 1 shows diagrammatically a network management system connectable to a communications network.

DESCRIPTION OF PREFERRED EMBODIMENTS

Figure 2:
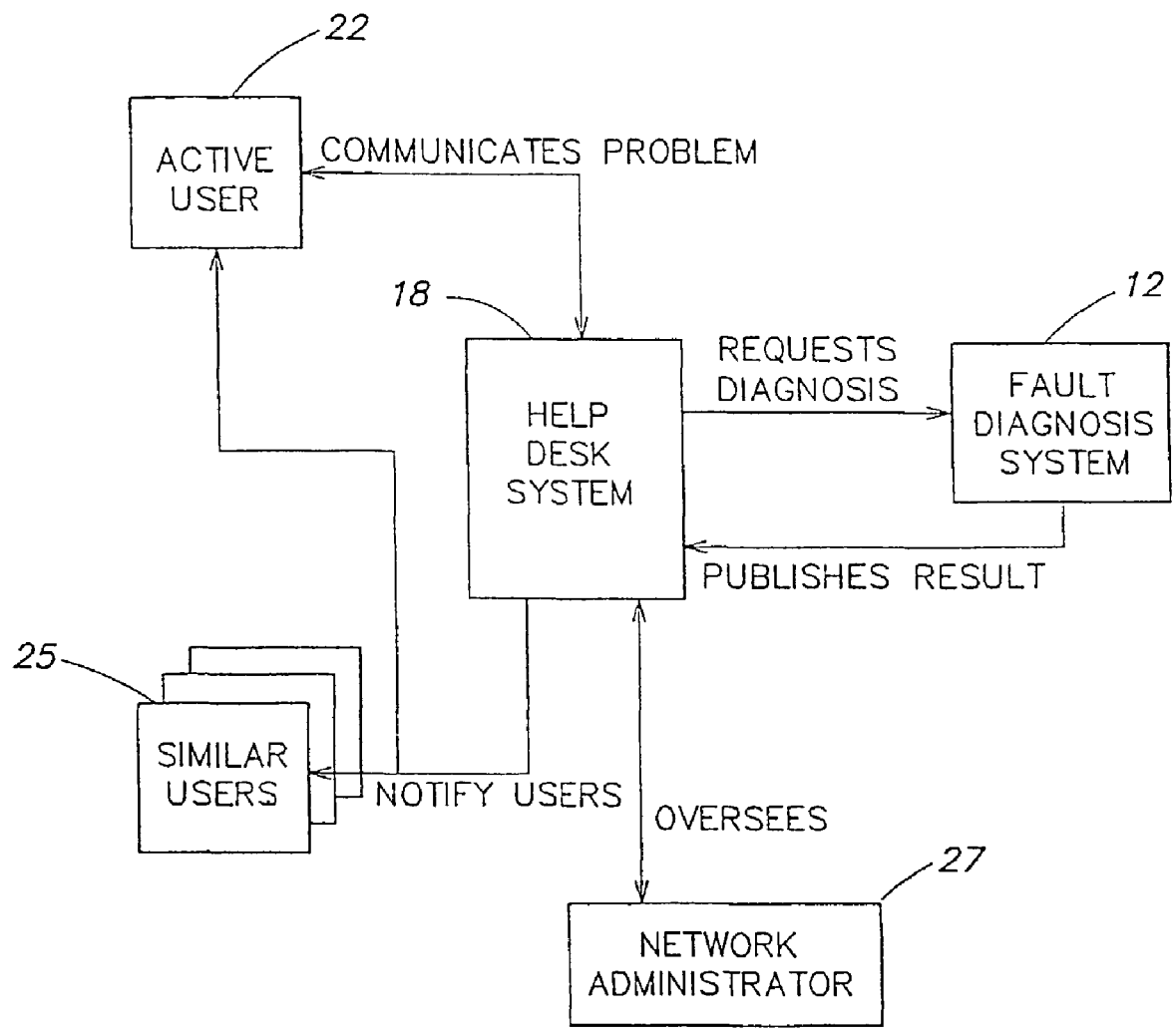
FIG. 2 shows diagrammatically a user centric help desk system facilitating interaction between users and a communications network.

FIG. 1 shows diagrammatically a network management system 10 including a fault diagnosis system 12, a topology mapper 14, an impact analyzer 16 and a help desk system 18. The network management system communicates with a communications network 20 (or application service). The network includes a set of interconnected network elements such as routers, bridges, switches, and repeaters. These network elements provide transportation of data between end stations. Furthermore, there are computers known as servers that provide services such as e-mail, accounting software, sales tools, etc. Typically, data is transmitted electronically or optically, wherein network elements forward data in packets, frames or cells to the intended destination. Servers include network adapters and/or software that interpret the electronic or optical data packet into the data elements and pass these elements to the appropriate application being hosted.

FIG. 2 illustrates interaction of a help desk system 18 with fault diagnosis system 12. Help desk system 18 automatically receives communications from an active user 22 regarding a fault or a problem in communications network 20. In response to active user's 22 communication, help desk system 18 automatically requests diagnosis of a possible problem from fault diagnosis system 12. Fault diagnosis system 12 performs a diagnosis procedures described in FIGS. 4, 4A, 6, 6A, 6B. After diagnosing a fault, fault diagnosis system 12 provides the result to help desk system 18. Help desk system 18 forwards this result to active user 22. Furthermore, help desk system 18 can also communicate the result to similar users 25 (i.e., users with a problem similar to the problem communicated originally by active user 22). Help desk system 18 may also communicate the result to a network administrator 27.

Referring again to FIG. 1, the network management system 10 includes a commercially available processor (for example, Pentium microprocessor manufactured by Intel Corporation) executing an operating system providing an operating environment for a network management program. The processor and the operating system provide a computer platform for which application programs are written in higher level programming languages. The computer (or application host) interfaces with permanent data storage, such as a magnetic or optical disk drive, a disk array, non-volatile RAM disk, or a storage area network, which maintain data files such as user configurations and policies. In general, the network management program may be configured as a generic software application residing in any commercially available computing platform.

Preferably, fault diagnosis system 12, topology mapper 14, and help desk system 18 are software applications written in Java and running on any computer with a Java Runtime Environment (JRE). For example, a Dell laptop computer with an Intel Pentium processor running the Windows 2000 operating system, or a Sun Ultra 60 computer running Solaris v. 2.7. Alternately, fault diagnosis system 12, topology mapper 14, and help desk system 18 are developed in any object oriented or structured programming language, and compiled for execution on any one or many computer platforms, or could be implemented on a neural network computing device.

The computer has a network adaptor that provides communication (preferably, but not necessarily, IP) to the users on the network. The fault diagnosis engine application may share a host with help desk system 18, and/or the topology mapper, or each can run on a separate host, in which case they communicate using a network adaptor. Topology mapper 14 determines the network topology and creates a model. The permanent data storage holds data files that describe the current network topology, and configuration files that control the performance of topology mapper 14. A user is an end station, interfaced to access the network or services, used by a person who is using the network, or is using services provided by the network.

Figure 4:
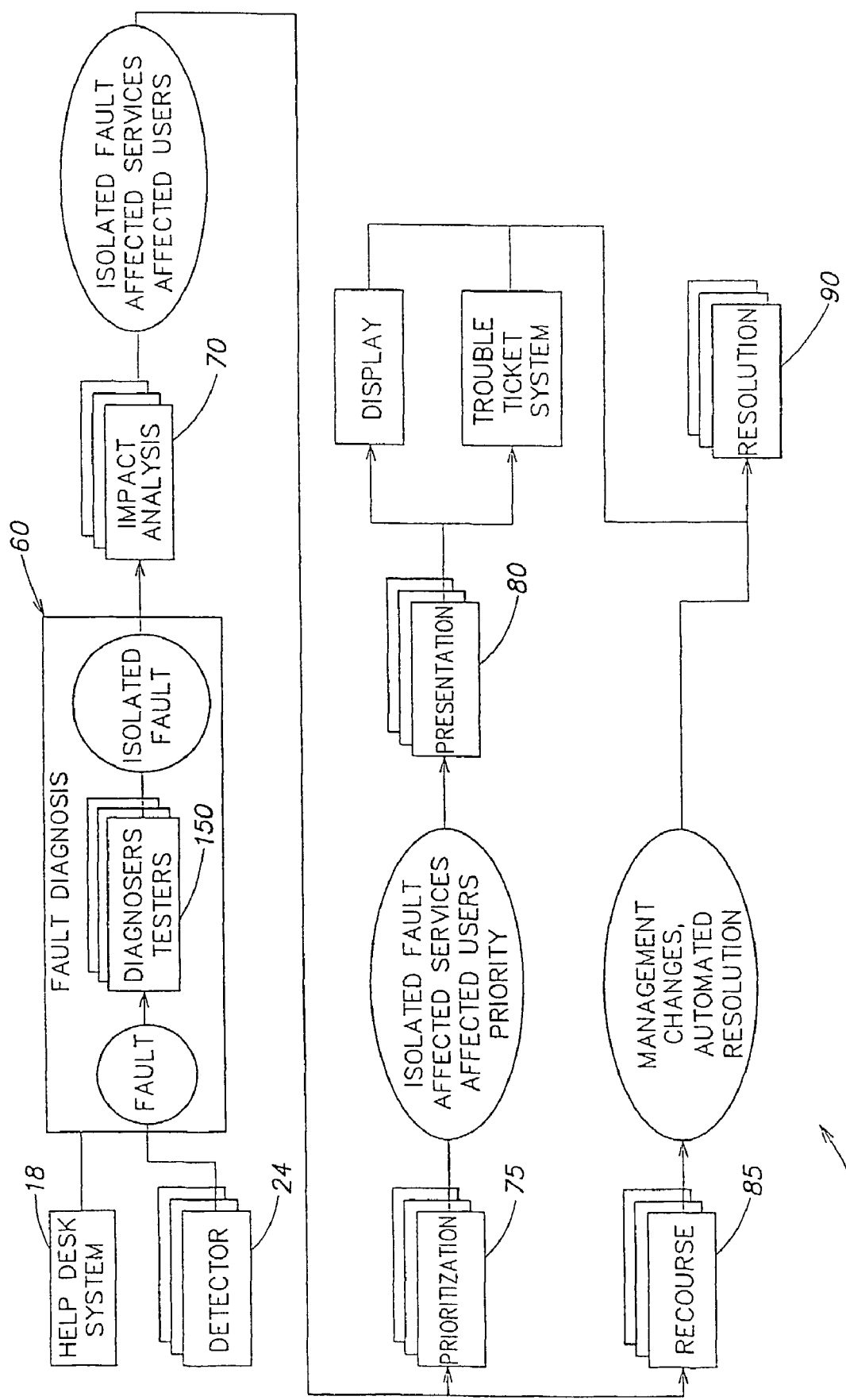
FIGS. 4 and 4A are block diagrams of a fault management and diagnosis process.

The network management system 10 performs a fault management process shown in FIG. 4. The entire process is part of a phased, componentized, but interconnected method, wherein all aspects of fault management are performed. The fault management process of FIG. 2 includes the following seven phases: fault notification, diagnosis 60, impact analysis 10, prioritization 75 presentation 80, recourse 85, and resolution 90.

Figure 3:
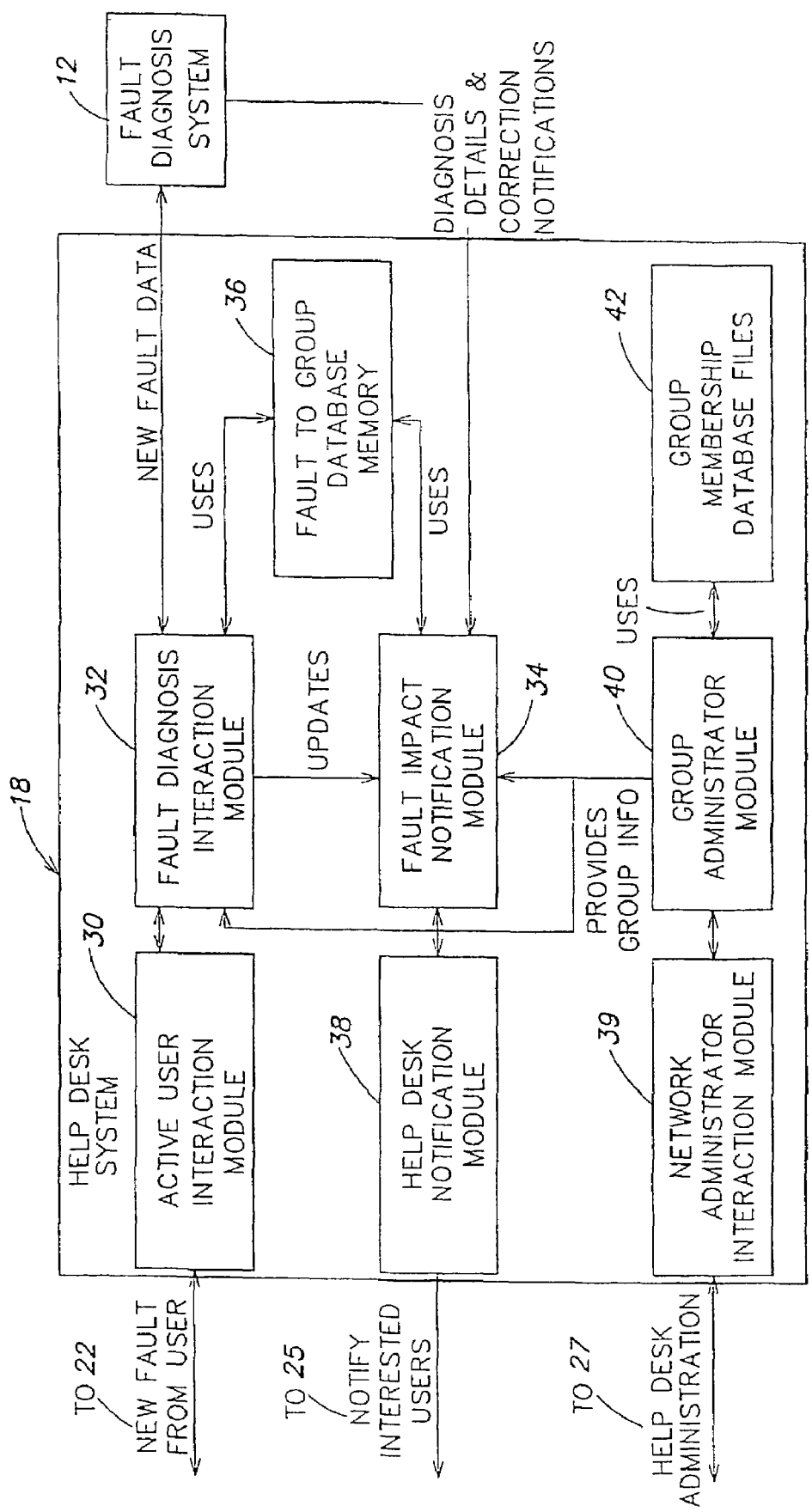
FIG. 3 illustrates diagrammatically elements of the help desk system shown in FIG. 2.
Figure 3A:
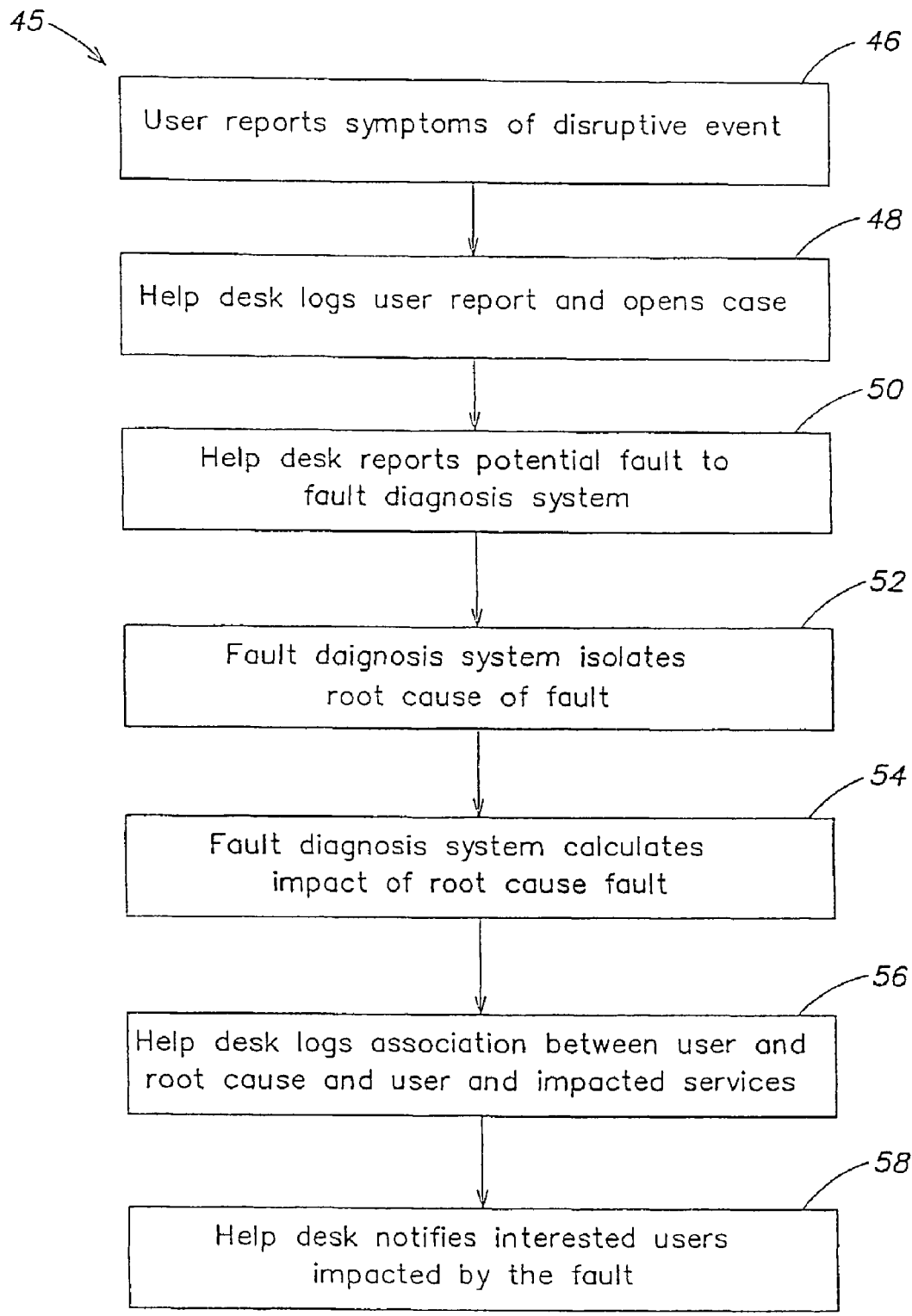
FIG. 3A illustrates diagrammatically operation of the help desk system of FIG. 3

FIG. 3A illustrates diagrammatically operations of help desk system 18. In step 46 a user reports a symptom of a disruptive event. Active user interface module 30 receives the report that is logged and a case is opened (step 48). Fault diagnosis interaction module 32 reports a potential fault to fault diagnosis system 12 (step 50). Fault diagnosis system isolates a root cause of the reported fault as described below in connection with FIGS. 4, 4A, 6, 6A, and 6B. Furthermore, fault diagnosis system 12 calculates the impact of the determined root cause fault and sends data to help-desk system 18 via fault diagnosis interaction module 32. Help desk system 18 logs association between user 22 and the determined root cause. Help desk system 18 also logs association between other users 25 and the impacted services (step 56). In step 58, help desk notification module 38 notifies interested users 25 regarding the determined impact.

Fault notification process is performed by fault detectors 130 (shown in FIG. 3) or help desk system 18. Fault notification process can also add information to the raw fault data previously detected by fault detectors 130. The fault data are assembled into fault objects inside fault diagnosis system 12.

Fault diagnosis 60 occurs after a "detected" fault is entered into a fault detection and management system 100, which is a generic system for diagnosing a fault in any a mechanical, electrical or other system. A fault detection and management system (FIG. 5), processes and correlates detected faults with other faults to determine their relationship. Fault detection system 100 finds one or more "root cause" faults and isolates these faults. Furthermore, the system can optionally suppress other symptomatic faults that were "caused" by the root cause fault. Fault diagnosis 40 can be performed in a single step or can involve many techniques such as examining device neighbor knowledge, tracing the route of management data, examining route tables and ACLs, etc.

Figure 5:
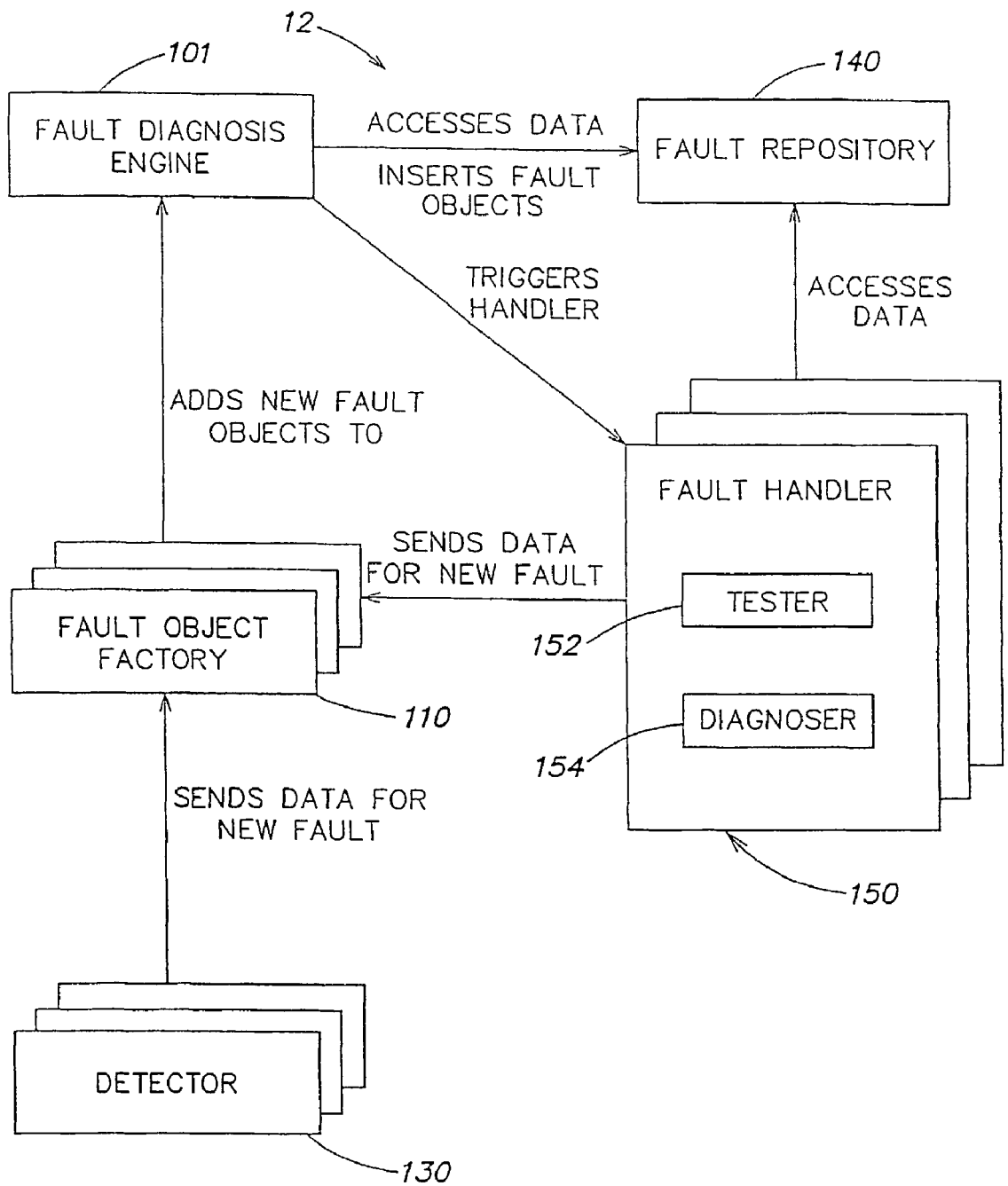
FIG. 5 is a block diagram of modules employed in a fault management and diagnosis system.

Fault impact analysis 70 determines the "scope" of the analyzed fault. After receiving a root cause fault determined, by fault diagnosis 60, impact analysis 70 determines the consequences of this fault. This determination includes analyzing the network services affected by the fault, the users affected by the fault, and any other ramifications the fault has on network 20, or the application being managed. Furthermore, impact analysis 70 may involve analyzing various logical layers that exist in a communication network and correlating a fault with its possible consequences at each layer. Impact analysis 70 may use a fault causality tree located in a fault repository 140 (FIG. 5). The interpretation schemes include analyzing how a network fault affects services like web servers or e-mail, examining how a misconfigured router running OSPF affects the users in each area, etc.

The network management system may also perform fault prioritization 75. After a fault has been diagnosed and its impact analyzed, the fault may be prioritized. Fault prioritization 75 assigns a priority/severity to each fault object and this is used to determine the proper presentation of the fault to a user. Fault prioritization process 75 may include multiple methods based on the type and scope of the fault such as examination of service level agreements and how the fault violates them, mission critical device analysis, and fault scope.

The network management system may also perform fault presentation 80. Fault presentation 80 provides the mechanism by which the system alerts a user that a fault has occurred. Fault presentation process 70 presents all information about the fault in a user friendly manner. Fault presentation 80 may include steps and processes the systems used to diagnose the fault, thus allowing a user to verify the diagnosis and "trust" the system to accurately diagnose faults. Fault presentation 80 may also include a network monitoring alarm system.

The network management system may also include fault recourse 85. Fault recourse 85 provides a way in which a user can change the network management based on a given fault. For example, fault recourse 85 may involve reducing or stopping polling of devices downstream from a fault, reconfiguring connectivity modeling, script invocation to fix a misconfigured static route, or configuring user groups for a different email server.

The network management system may also include fault resolution 90. After presenting a fault to a user and fixing the problem, problem resolution 90 records the process for future fault detection and diagnosis. Fault resolution 90 can automatically trigger for any single resolved fault a re-evaluation of associated faults in the system. This re-evaluation proactively assesses the full scope of a resolved fault. If an associated fault is still not resolved, diagnosis can be re-started to determine the cause. This process is facilitated by the use of the fault causality tree created as a result of fault diagnosis process 60.

Figure 4A:
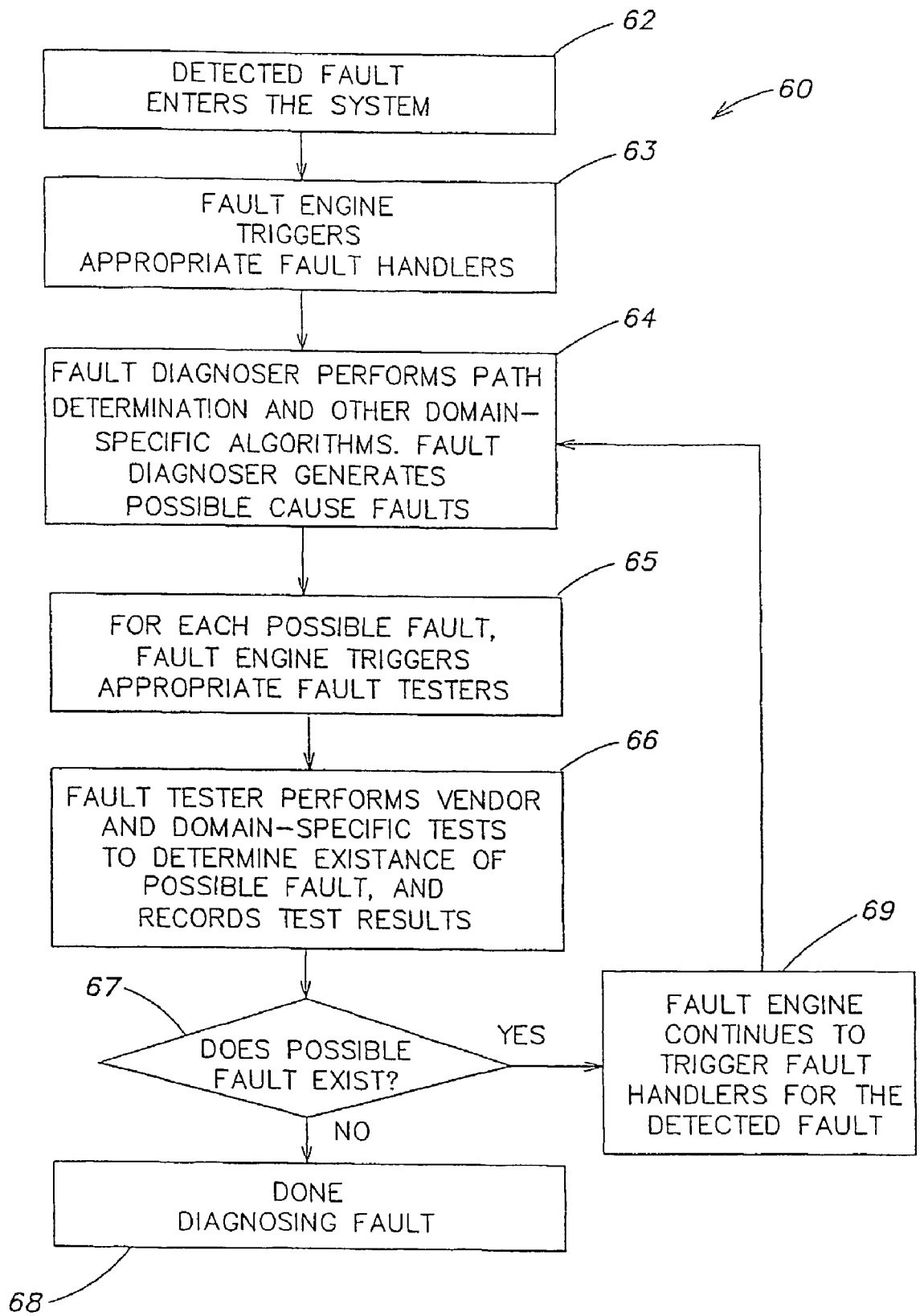

FIG. 4A shows diagrammatically in detail fault diagnosis process 60. A reported fault enters the fault detection and management system and a fault object is created (step 62). The fault diagnosis engine (101 in FIG. 5) triggers appropriate fault handlers (step 63). A diagnoser fault handler generates possible faults that may be causes of the previously entered fault (step 64). For each generated, possible fault, fault diagnosis engine 101 triggers appropriate tester fault handlers (step 65). Each tester fault handler performs vendor-specific and domain-specific tests to determine the existence of one or several possible faults. Next, the tester fault handler records test results (step 66). If possible additional faults exist, the fault diagnosis engine continues to trigger tester fault handlers and diagnoser fault handlers (step 69). If there are no other possible faults, the fault diagnosis engine has isolated the fault and the system proceeds to impact analysis 70.

FIG. 5 illustrates diagrammatically a fault diagnosis system 12. Fault diagnosis system 12 includes five main parts: a fault diagnosis engine 101, a fault object factory 110, fault detectors 130, a fault repository 140, and fault handlers 150. Fault detection and management system 100 has the ability to receive detected fault information from multiple sources, control the management of the faults, and produce a root cause analysis. Furthermore, the system also provides a mechanism for performing fault correlation and impact analysis. The impact assessment is not limited to the impact of the communications network, but may include disruptions in services or applications that depend on the network infrastructure.

Figure 5C:
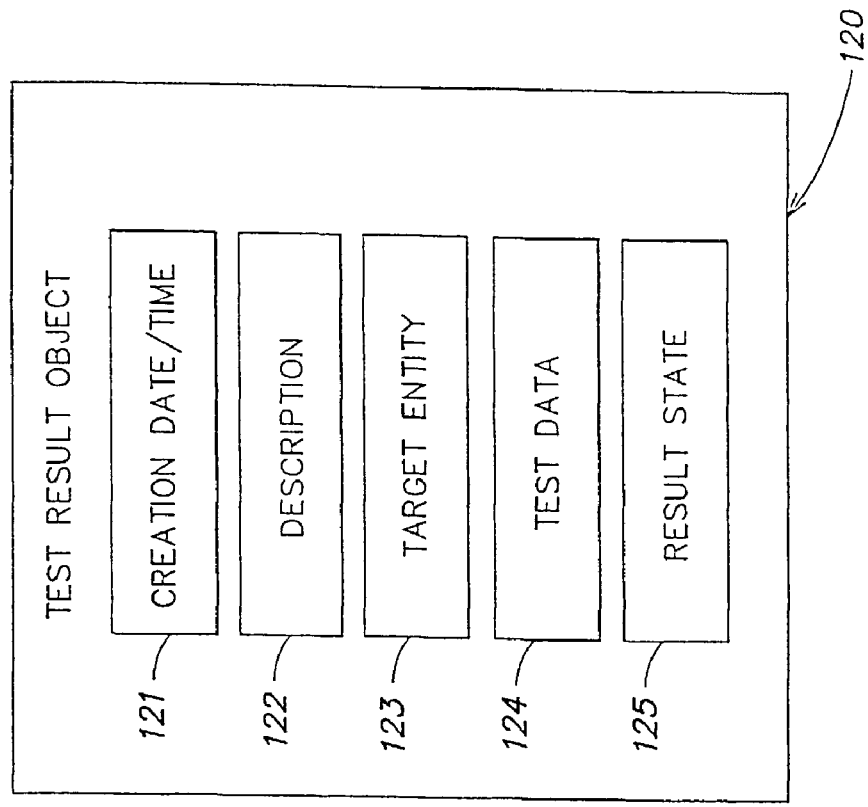
FIGS. 5A and 5C are block diagrams of objects employed in the fault management and diagnosis system of FIG. 5.
Figure 5A:
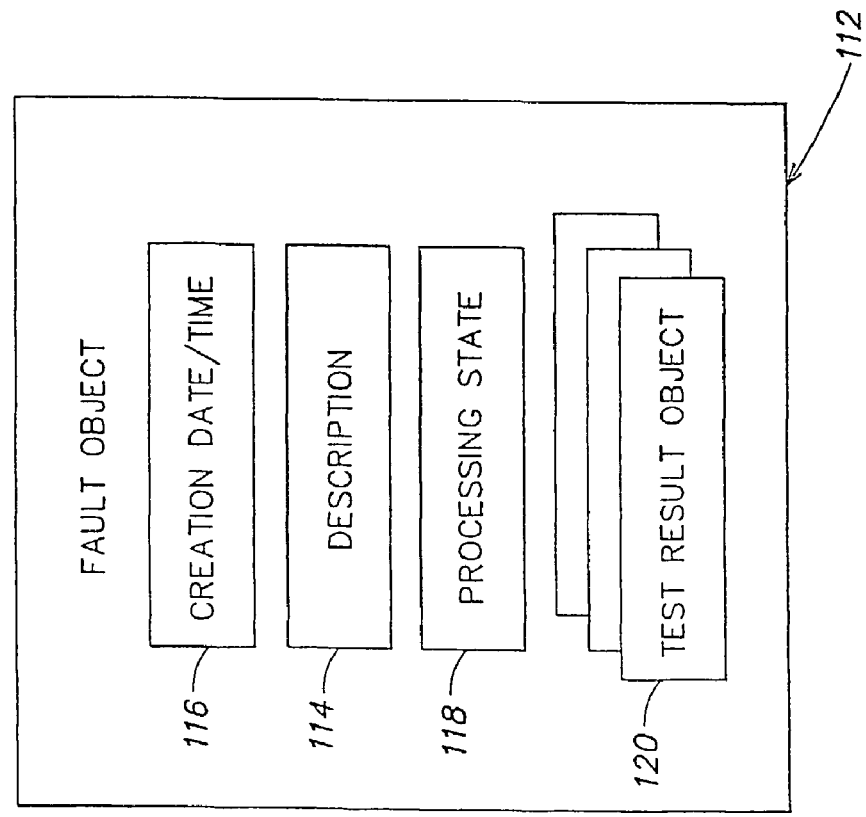

Fault object factory 110 receives data from fault detectors 130 and creates fault objects 112 shown in FIG. 5A. Each fault object 112 is associated with a fault type and there may be many fault types. Furthermore, each instance is a separate occurrence of a problem, potential problem, or condition of a communication network or an element located in the communication network (such as a misconfiguration, a degradation of service, physical failure or other).

Referring to FIG. 5A, the entire architecture of the fault detection and management system based on fault objects 112, which are records representing a detected problem, a potential problem, or a condition. Fault object 112 includes information about a detected fault, that is, includes a description of the problem or condition stored in field 114, time and date of the reported problem 116, a fault processing state 118, and one or more test result objects 120. The fault structure includes a context that is a mechanism for sharing varying amounts of data related to the fault; these amounts may exist between each instantiation of a type of fault.

Referring to FIG. 5, fault detector 130 detects a problem or potential problem on an entity in a managed system. Fault detector 130 provides a record of the condition to fault object factory 110, which generates fault object 112. Fault detector 130 can monitor an entity or receive unsolicited notification from an entity when a problem occurs, according to different methods known in the art. Fault detector 130 may perform a test and may provide to fault object factory 110 data with the results of the performed tests. Fault detector 130 may share a host with fault diagnosis engine 101, or may reside externally as an agent.

Figure 5B:
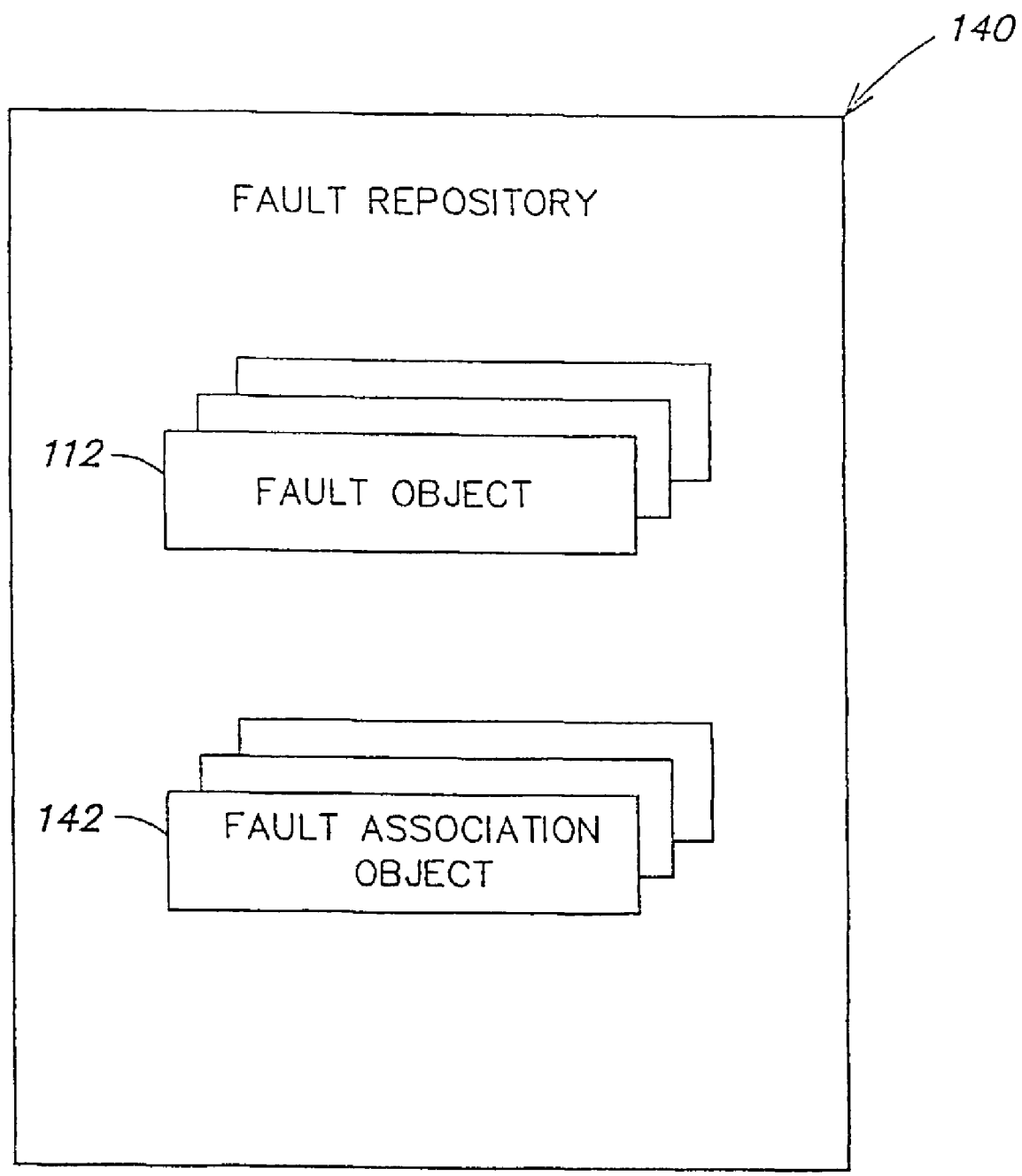
FIG. 5B is a block diagram of a fault repository module employed in the fault management and diagnosis system of FIG. 5.

Referring to FIG. 5B, fault repository 140 is the component used by a fault detection and management system 100 to store and access fault information. fault repository 140 stores every fault object 112 present in the system. Each component of the system (detection, diagnosis, etc.) can enter new fault objects into fault repository 140 and access any fault object 112. Preferably, fault repository 140 includes a table structure with services capable of searching and locating existing faults.

Fault repository 140 also includes fault associations 142, which provides a mechanism for relating faults to one another. Specifically, each defined fault association relates two fault objects. One fault object is on the left side of the association, and the other fault object is on the right side as shown for fault trees below. The semantics of an association are defined by the type of the association. New fault association types can be defined and added to the system, preferably using Interface Description Language (IDL) definitions of an interface for a service that uses the Common Object Request Broker Architecture (CORBA) transport protocol.

Figure 6:
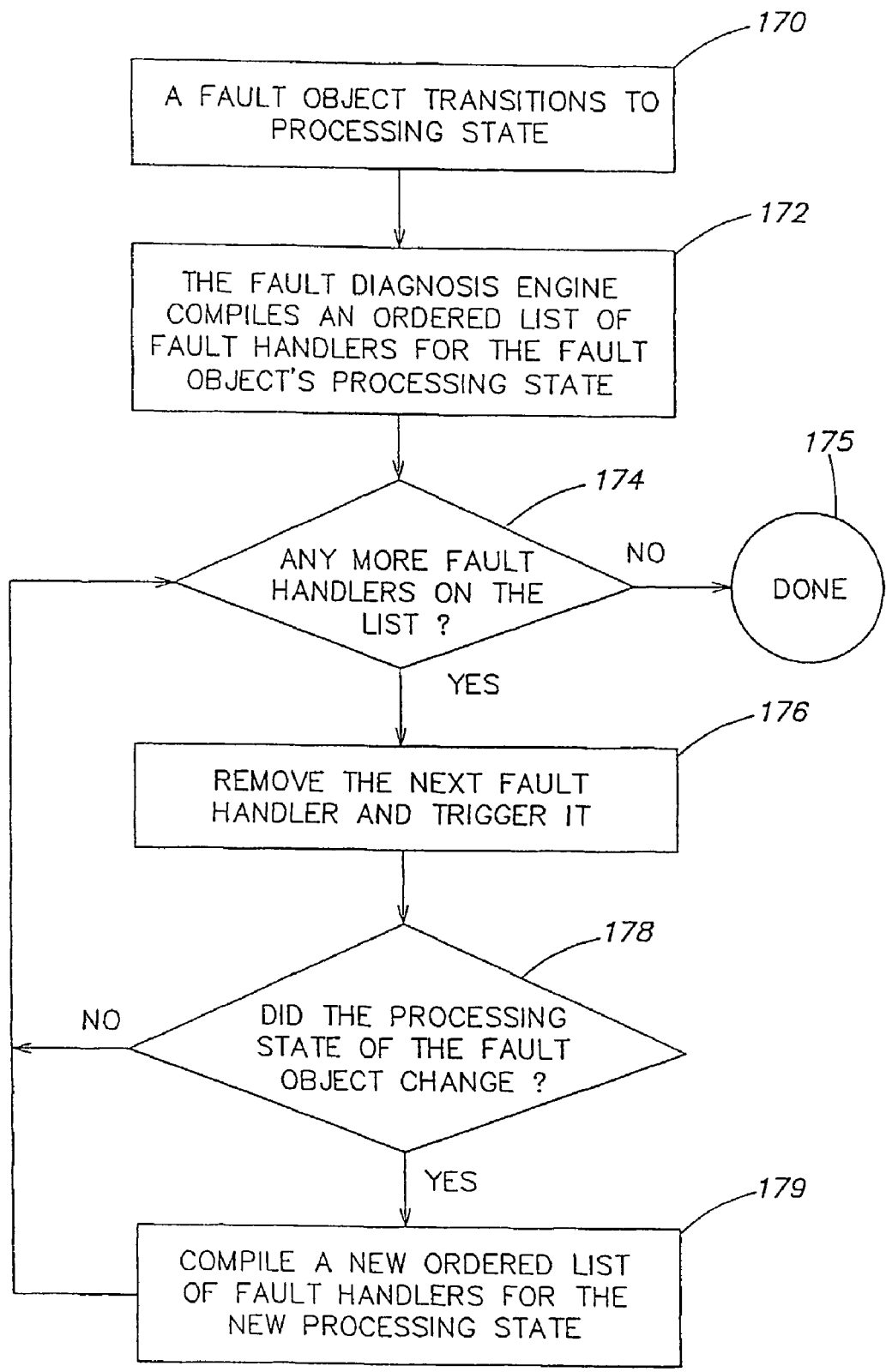
FIG. 6 is a flow diagram that illustrates a triggering mechanism for fault handlers by a fault diagnosis engine shown in FIG. 5.
Figure 6A:
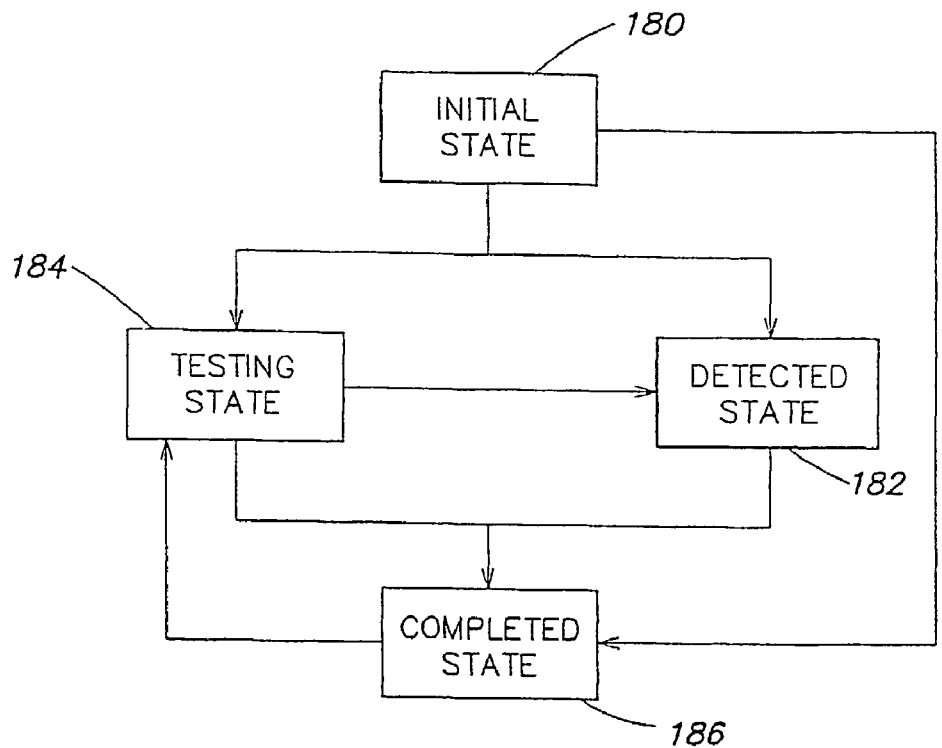
FIGS. 6A and 6B are block diagrams depicting processing states of a fault during fault analysis.

Referring again to FIG. 5, each fault handler 150 performs a designated type of work as a result of a fault object entering a certain processing state (shown in FIG. 6A). Fault handlers 150 may exist internal to the system, or reside externally in a separate process. Fault handlers 150 are registered for a particular fault type and state and, as part of the registration process, each fault handler 150 has an integer priority value. Then, fault handlers 150 are sorted by their priority values so that a fault handler with the lowest priority value is triggered first and subsequent handlers are triggered in sequence, as described below. One type of fault handler 150 can test a fault object and create a test result record. Furthermore, fault handler 150 may create additional types of fault objects, create associations between fault objects, correlate fault objects that indicate a similar problem, or perform impact analysis on a fault object to determine the scope of a problem. A tester fault handler 152 performs a selected test on a fault. A diagnoser fault handler 154 creates additional types of fault objects.

Fault diagnosis engine 101 is the central component of fault detection and management system 100 since it drives the management and diagnosis of faults. Fault diagnosis engine 101 provides a generic mechanism for fault handlers 150 to register for changes in the processing state of faults of a given fault type. Fault diagnosis engine 101 may employ any mechanism to specify registrations. The preferred implementation of fault diagnosis engine 101 uses XML (Extensible Markup Language) technology.

Referring to FIG. 6, when a fault transitions to a state for which a handler has registered, the engine triggers the handler to perform its work. Fault diagnosis engine 101 can trigger one of fault handlers 150 arbitrarily or may use some ordering mechanism. Preferably, in steps 174 to 179, fault diagnosis engine 101 uses a priority mechanism to order the triggering of fault handlers that are sorted by their priority value (by triggering first a fault handler with the lowest value).

Fault diagnosis system 12 uses fault processing states for analyzing faults. A fault's processing state represents its status in the fault management process and provides a mechanism to control the management of the fault. A fault can have a large number of possible states, and a fault can transition from state to state using different ways, as shown in FIGS. 5 and 5A. Preferably, the system utilizes a fault type hierarchy in which generic base fault types are defined and from which, new more specific fault types can be derived. Each fault, which exists in the system, is of some pre-defined fault type.

Referring to FIG. 5C, a test result object 120 includes a record of test results that were performed to determine the existence of the problem or condition for which the fault was created. Test result object 120 includes a textual description of the test (field 122), data identifying from the target of the fault (field 123), test data (field 124), any thresholds and parameters used in determining the test result (field 125). Test result record 125 also contains a state representing the status of the test.

While performing its work on a fault object, a fault handler may cause the processing state of the fault to be changed. In this case, no other handlers for the current state are triggered. Fault diagnosis engine 101 obtains the handlers for the new state and resumes triggering with the new handlers when the current handler completes its work.

FIG. 4 illustrates the triggering mechanism using a flow diagram. Fault diagnosis engine 101 provides a triggering mechanism and controls and manages the entire diagnosis process.

Figure 6B:
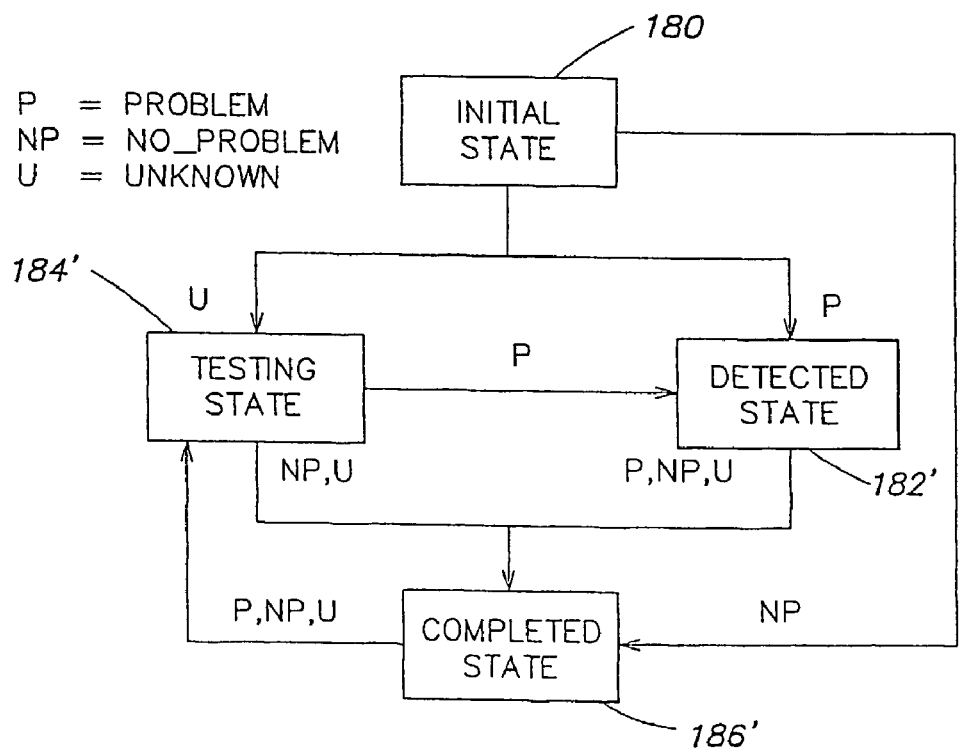

Referring to FIGS. 6A and 6B, fault diagnosis engine 101 utilizes processing states of a fault to control the flow of diagnosis for that fault. As described above, fault handlers 150 are triggered for a fault based on the current processing state. The transition diagram of FIG. 5 defines the following processing states: An initial state 180 begins the life-cycle of a fault object. A detected state 182 indicates that an external fault detector 130 or an internal handler 150 positively determined the condition (that the fault represents) as a problem. A testing state 184 indicates the fault is unverified; that is, the condition that the fault represents requires testing to determine if it is a problem. A completed state 184 indicates that fault diagnosis has completed for the fault.

Fault diagnosis engine 101 may allow fault handlers 150 to directly transition a fault between states, wherein preferably the processing state is hidden from fault handlers 150. The engine transitions a fault's processing state based on the state of the current result of the fault as provided by the handlers. These are the following three test result states (shown in FIG. 6B): PROBLEM indicates a test has identified the fault to be a problem; NO_PROBLEM indicates a test has verified the condition that the fault represents does not or no longer exists; and UNKNOWN indicates a test could not be completed for some reason or the condition that the fault represents requires verification.

FIG. 6B illustrates transition of the processing states (shown in FIG. 6A) based on test results of an analyzed fault. For example, fault diagnosis engine 101 triggers tester fault handler 152 (FIG. 5) for testing state 184 and fault handler diagnoser 154 for detected state 182. Furthermore, fault handler diagnoser 154 may also be triggered for testing state 184 if there are no tester fault handlers that can perform a direct test. There may also be fault handlers for completed state 184, which would not perform diagnosis, but would perform other tasks such as correlating faults that share a common root cause (described below) or notifying a presentation system to display the diagnosis results when performing presentation process 70. Fault diagnosis engine 101 may employ further rules that govern the triggering of fault handlers when there are multiple handlers (or types of handlers) for a particular processing state. If there are multiple types of handlers, the engine may impose an ordering such that all handlers of one type are triggered before any handlers of another type. Furthermore, if a handler provides a-concrete result, as defined by the various result states, the engine may suppress remaining handlers of that type from being triggered and/or may suppress handlers of other types.

According to the preferred embodiment, since there may be both tester fault handlers 152 and diagnoser fault handlers 154 registered for testing state 184, fault diagnosis engine 101 imposes a rule that all tester fault handlers are triggered before any diagnoser fault handler. This is because a tester fault handler can directly determine the existence or non-existence of a problem, but a diagnoser fault handler cannot. In addition, if a tester fault handler or diagnoser fault handler provides a concrete result, then fault diagnosis engine 101 suppresses remaining handlers for the current processing state. A concrete result is one whose state is either PROBLEM or NO_PROBLEM. A result state of UNKNOWN is not concrete, that is a result could not be positively determined, as shown in FIG. 6B.

Fault diagnosis system 12 utilizes a decomposition approach in the diagnosis of a fault to determine the root cause. Fault detector 130 enters a problem or potential problem into fault object factory 110, which creates a fault object treated as a symptom fault. The symptomatic fault is decomposed into one or more constituent faults that further refine the symptom. Each constituent fault represents a possible suspect that may be causing the symptom. For each constituent fault, tests may be performed to determine the existence of a problem or the fault may be decomposed into further suspects. The process continues until all faults have been completely decomposed and there are no more suspects.

The end result of this process is a hierarchy of faults in the form of a tree with the original symptomatic fault at the root. The fault tree includes a root fault level, one or several intermediate fault levels, and a leaf fault level. Each fault in the tree, except the root, has at least one parent fault from which it was decomposed. Each fault also has zero or more child faults that were spawned from it. A child fault represents a possible cause of its parent. A fault that has children but is not the root is termed an intermediate fault. A fault that has no children, that is one that could not be further decomposed, is termed a leaf fault. A leaf fault that indicates a problem is a probable cause of the root symptom. There may be more than one root cause.

The fault tree enables fault diagnosis system 12 to locate one or several root causes of any fault in the tree by traversing the children of that fault and compiling the leaf fault(s) that indicate a problem. The fault tree as a whole also embeds the entire diagnosis process. By traversing the entire sub-tree of any fault, one can compile a complete log of the steps taken and the results of tests performed to diagnosis the fault. Thus, a presentation process 80 can display the root cause(s) of a fault and/or can present a diagnosis log allowing an end user to verify the process.

Referring to FIG. 5, fault diagnosis engine 101 manages the structure of the fault tree. Fault handlers 150 provide the contents and semantics of the tree. For each fault in the fault tree, one or more fault handlers 150 are triggered. Fault handler 150 may perform a specific test on the fault and provide a result of the test to the engine or it may create one or more child faults to find a possible cause. Each new child fault creates a new branch in the fault tree. Each branch may be represented preferably by fault associations called MaybeCausedBy or CausedBy.

Tester fault handler 152 performs a direct test and a diagnoser fault handler 154 spawns possible suspect faults. Other types of handlers may correlate similar faults or perform impact analysis. Fault handler 150 could be both test fault handler 152, and diagnoser fault handler 154, which can perform a test, provide a result and also attempt to find the cause. Preferably, a handler is not both test fault handler 152 and diagnoser fault handler 154. Furthermore, if diagnoser fault handler 154 does not provide a direct result for a fault object, a composite result is computed from the results of the fault's children.

Fault diagnosis engine 101 computes a composite result for two faults (i.e., children of a decomposed parent fault) according to the following default rules for composite result computation:

1. If any child fault result state is PROBLEM, then the parent fault's result state is PROBLEM.
2. If all child fault result states are NO_PROBLEM, then the parent fault's result is NO_PROBLEM.
3. otherwise, the parent fault's result is UNKNOWN.

Referring to FIG. 3, help desk system 18 includes an active user interaction module 30, a fault diagnosis interaction module 32, a fault impact notification module 34, a fault-to-group data base memory 36, a help desk notification module 38, a network administrator interaction module 39, a group administrator module 40, and a group membership database 42. Active user 22 communicates automatically with active user interaction module 30, which provides the received user data to fault diagnosis interaction module 32. Fault interaction diagnosis module 32 is implemented using CORBA, which enables physical separation (e.g. separate computers) between fault diagnosis system 12 and help desk system 18. Fault diagnosis interaction module 32 provides the received data to fault diagnosis system 12. Furthermore, after performing fault diagnosis, fault diagnosis system 12 provides fault data back to fault diagnosis interaction module 32, which updates information in fault impact notification module 34.

Fault impact notification module 34 may perform an impact analysis related to previously reported fault data. Then, fault impact notification module 34 provides notification data to help desk notification module 38, which notifies similar users 25. Group administrator module 40 receives data from network administrator interaction module 39 and provides the received administrator data to fault impact notification module 34 and provides this data to group membership database 42. Group membership database 42 stores various files related to previously reported faults, and diagnosis data related to the previously reported faults.

Help desk system 18 performs network user communication and integrates its operation with a topologically aware event analysis performed by fault diagnosis system 12. One embodiment of fault diagnosis system 12 is described in detail in the co-pending PCT application (Docket No. A3-03WO) entitled "Systems and Methods for Diagnosing Faults in Computer Networks" filed on May 7, 2001, which is incorporated by reference.

Help desk system 18 draws inferences regarding events that affect users 25. Users 25 may interact directly with help desk system 18, rather than rely on a busy help desk operator. Users 25 may be notified when a service that they depend upon is being disturbed by a fault on network 20. This saves a call to a traditional help desk and time spent looking for a local cause. Users 25 may also be notified when a service becomes available again once the fault is cleared, saving the users the hassle of checking for service restoration.

In the preferred embodiment, a user 22 can report events or request the status or diagnosis log of faults from help desk system 18 via a web-based intranet using ubiquitous browser software. Additionally, also from help desk system 18 can send users 25 unsolicited reports that describe current conditions of the network that may affect them. When requested, user 22 can view the status of the network and network services that may impact his network experience. This system is also used by help desk operators or system administrators 27 to broadcast information concerning planned or unplanned service disruptions to users 25 who will be affected. Unsolicited user communication is achieved via e-mail or by updating a web page being displayed by a browser running on the user's computer.

Help desk system 18 can also leverage the analysis provided by the topologically aware fault diagnosis (performed, for example, by fault diagnosis system 12 described in detail in the above-cited co-pending PCT application) to display a diagnosis log to the help desk operator. This information can be used to speed the time needed to assign a trouble-shooter to solve the root problem. In an environment, where the users are geographically separate from the help desk staff and were long distance phone calls are used to interact with a traditional help desk support, help desk system 18 significantly reduces phone service costs by facilitating communication over the Internet or other inexpensive media.

Help desk system 18 can also leverage the analysis provided by the topologically aware fault diagnosis system 12 to display a diagnosis log to the help desk operator. This information can be used to speed the time needed to assign a trouble-shooter to solve the root problem.

Figure 7:
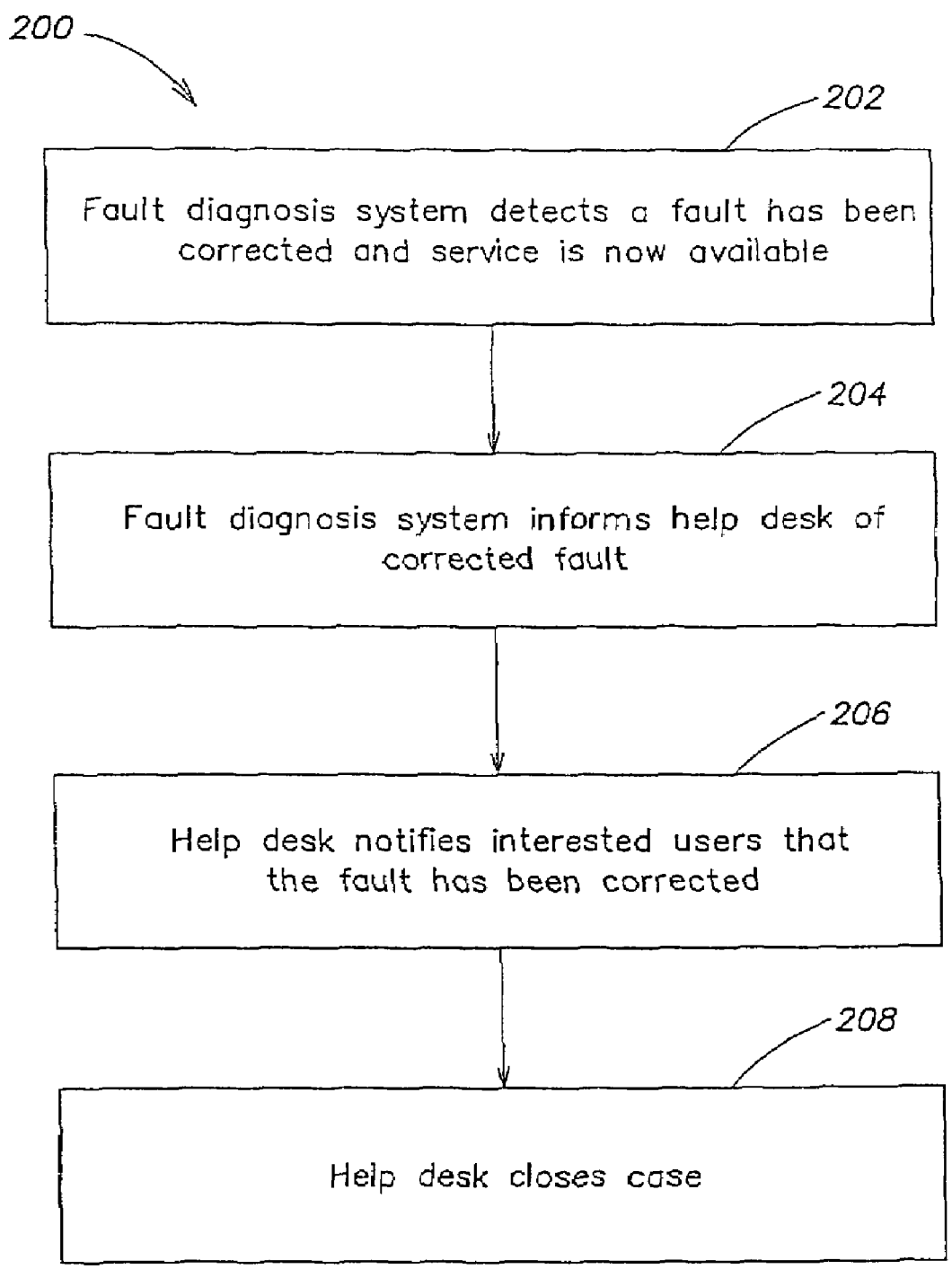
FIG. 7 is a flow diagram of a fault correction notification process performed by the help desk system of FIG. 3.

FIG. 7 illustrates a fault correction notification process 200 performed by help desk system 18. Fault correction notification process 200 may be performed after performing helpdesk process 45 and help desk 18 notifies users 25 about the fault (step 58 in FIG. 3A) Referring still to FIG. 3A, in step 202 fault diagnosis system 12 detects that a fault has been corrected and service is now available (step 202). To perform this detection; fault diagnosis system 12 may interact with topology mapper 14 using a time dependent topology map, best described in the co-pending PCT application entitled "Systems and Methods for Constructing Multi-Layer Topological Models of Computer Networks" (Attorney Docket A3-02WO), filed on May 7, 2001, which is incorporated by reference as if fully set forth herein. Fault diagnosis system 12 then informs help desk system 18 regarding the corrected fault (step 204). Help desk automatically notifies interested users 25 that the fault has been corrected and subsequently, help desk closes this fault case.

Figures 8, 9:
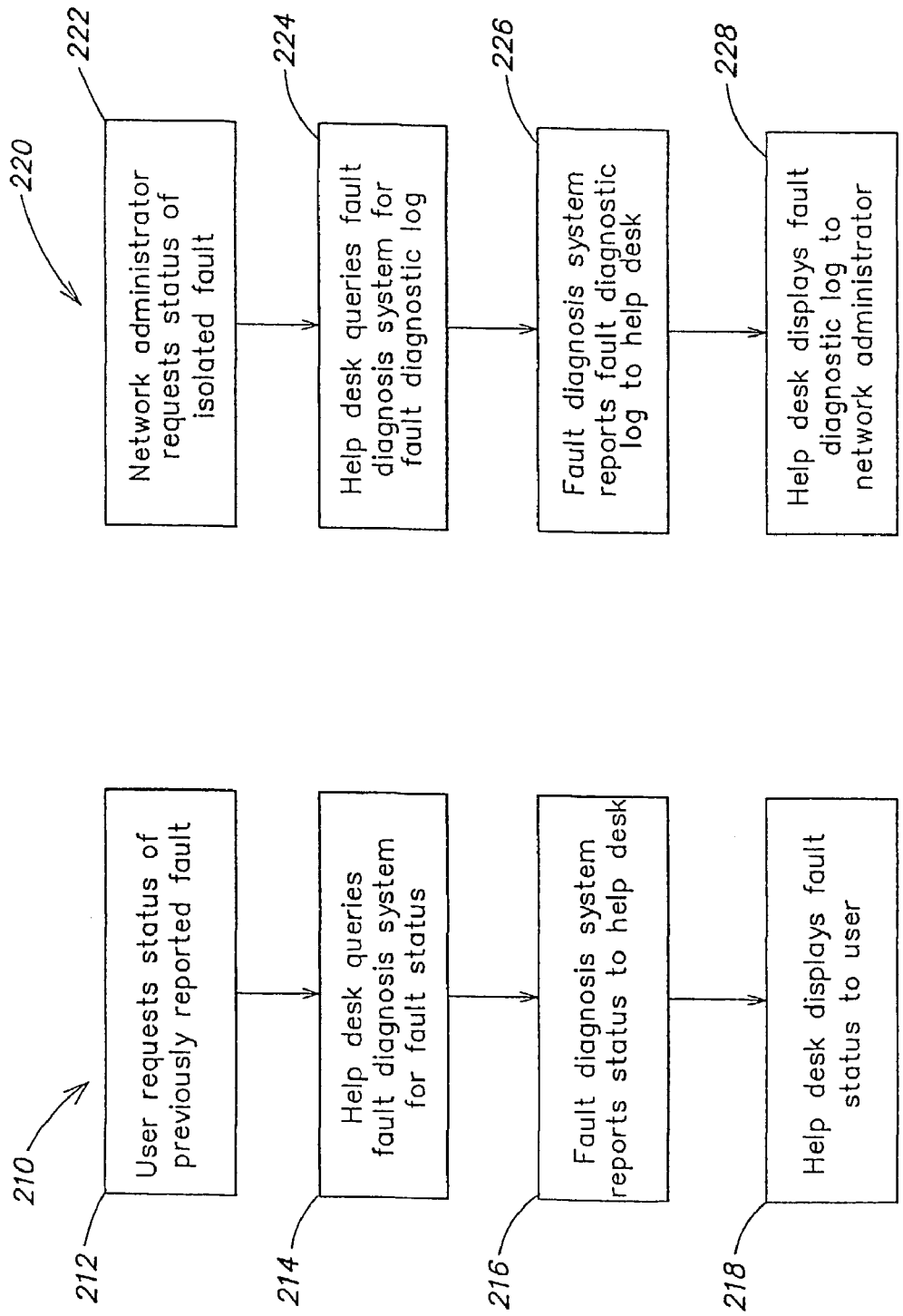
FIG. 8 is a flow diagram of a status request process performed by the help desk system of FIG. 3.
FIG. 9 is a flow diagram of a process for performing an automated diagnosis request by the help desk system of FIG. 3.

FIG. 8 illustrates diagrammatically a status request process 210. In step 212 users 22 request a status update of a previously reported fault. Help desk system 18 queries fault diagnosis system 12 about the fault status. Subsequently, fault diagnosis system 12 reports the status back to help desk system 12 (step 216), and help desk system 18 provides the received fault status to user 25 (step 218).

FIG. 9 illustrates a process 220 for performing a diagnosis request. Network administrator 27 requests a status of an isolated fault (step 222). Help desk system 18 sends a request to fault diagnosis system 12 for a fault diagnostic log (step 224). In response, fault diagnosis system 12 reports the fault diagnostic log back to help desk system 18 (step 226). Help desk system 18 may forward the received fault diagnostic log to network administrator 27 (step 228).

An important part of the above-described process is finding out which users are impacted by a disruption. Help desk system 18 has several sources available from which to infer a disruption and provides automatic, immediate notification. The help desk allows system administrator 27 (or help desk operator) to create group profiles that contain properties of groups of users. These properties may include DNS server, DHCP server, default gateway, e-mail server, application server dependencies, and other characteristics that define the group's network experience. System administrator 27 may explicitly associate users to group profiles.

Alternately, help desk system 18 may infer a user's group membership by examining certain known or inferred user characteristics, such as IP Address or types of software agents running on user's system that respond to well known (either proprietary or standard) protocol requests. For example, a system administrator declares that the "engineering" group has an IP address range between 192.168.112.1 and 192.168.112.63, and all users in this group depend on an application server "foo". Help desk system 18 associates all users with an IP address within this range to the "engineering" group. If there is a service disruption that prevents the engineering subnet from reaching the "foo" server, all users in that group may be notified (or considered for notification), as described above.

User 22 may be associated with a group based on a service disruption reported. For example, if a user with an IP address outside of the "engineering" group range reports a problem reaching the "foo" server, help desk system 18 may look for other groups with a dependence on the "foo" server. If none are found, the user may be associated "loosely" with the engineering group. This "loose" association may be removed if a more compelling association is inferred. A more compelling association may be a match of two group properties. Similarly, if a second property learned or inferred about the user matches a property defined about the engineering group, the association would become "firmer".

Maintaining a group profile also allows the help desk to compare a user's configuration against an "approved" group configuration stored in group membership database files 42. Any differences could indicate configuration changes that could lead to a resolution of problem. Alternatively, periodic configuration checks could detect problems before a user notices a service disruption.

Advantageously, fault diagnosis system 12 may utilize a topology map provided by topology mapper 14 described in co-pending PCT application entitled: System and Methods for Constructing Multi-Layer Topological Models of Computer Networks (Docket No. A3-02WO), filed on May 7, 2001, which is incorporated by reference.

Numerous other embodiments not described in detail here can apply the principles described to particular applications and are within the scope of the claims.

What is claimed is:

1. A help desk system for providing help desk support in connection with a network, said help desk system constructed and arranged to automatically initiate an investigation of a network resource in response to receipt of a help desk submission and to automatically provide to a network user a result of said investigation, said help desk system comprising:
  a user interaction module constructed and arranged to receive said help desk submission from any network user, a portion of said help desk submission associated with a network resource, and in response to receipt of said help desk submission to automatically initiate an investigation request to investigate a condition of said network resource; and
  a fault diagnosis interaction module constructed and arranged to interface with said user interaction module to receive said investigation request therefrom, said fault diagnosis interaction module comprising:
  an interface mechanism responsive to said investigation request to automatically send a fault diagnosis request to initiate said investigation of said condition of said network resource with a fault diagnosis system, said interface mechanism to receive a result of said fault diagnosis request from said fault diagnosis system and said interface mechanism responsive to said receipt of said result to automatically identify network users affected by said result and to automatically send an unsolicited message describing the result of said investigation to the identified network users.

2. The help desk system of claim 1, wherein said fault diagnosis system is constructed and arranged to detect a change in said condition of said network resource and automatically provide said change in said condition to said fault diagnosis interaction module.

3. The help desk system of claim 1, wherein said identified network users are notified about the corresponding result without using one of a help desk operator, a help desk administrator, or a network administrator.

4. The help desk system of claim 3 further including a fault impact notification module constructed and arranged to receive said result of said fault diagnosis request from said fault diagnosis interaction module and to determine if said condition of said network resource has an effect on a one or more users of said network, wherein a network user is identified as being affected by said result if said condition of said network resource may affect the network user's use of said network.

5. The help desk system of claim 4 further comprising a group administrator module.

6. The help desk system of claim 5 further comprising group membership database files.

7. The help desk system of claim 6 further comprising a database memory.

8. The help desk system of claim 7 further comprising a network administrator interaction module constructed and arranged to communicate with a network administrator.

9. The help desk system of claim 4, further comprising a help desk notification module constructed and arranged to receive from said fault impact notification module a notification of users identified as being affected by said condition of said network resource, and responsive to receipt of said notification to automatically send an unsolicited message containing information associated with said notification to the identified users.

10. The help desk system of claim 1 further including a user group service association module.

11. The help desk system of claim 1, wherein the network resource comprises at least one of a software component a hardware component.

12. The help desk system of claim 1, wherein said unsolicited message is at least one of a ticker-tape notification, an electronic mail message, or an update of a web page being viewed by a user.

13. The help desk system of claim 1, wherein network users affected by said result are identified through an inferencing mechanism.

14. The help desk system of claim 1, wherein at least one network user is not a help desk operator, help desk administrator, or network administrator.

15. In a help desk system, a method of providing help desk support in connection with a network, said help desk system automatically initiating an investigation of a network resource in response to receipt of a help desk request and automatically providing to a network user a result of said investigation, the method comprising the acts of:
receiving, by a user interaction module of said help desk system, a help desk request from any network user, a portion of said help desk request associated with a network resource;
said user interaction module, in response to receipt of said help desk request, automatically sending an investigation request to a fault diagnosis interaction module to initiate an investigation of a condition of said network resource;
said fault diagnosis interaction module, in response to receipt of said investigation request, automatically sending a fault isolation request to a fault diagnosis system to investigate said condition of said network resource;
said fault diagnosis interaction module receiving a result of said fault isolation request from said fault diagnosis system;
said fault diagnosis interaction module, in response to receipt of said result, automatically identifying network users affected by said result and automatically sending an unsolicited message to the identified network users describing the result of said investigation.

16. The method of claim 15 further comprising receiving fault data associated with said result from said fault diagnosis system by said fault diagnosis interaction module, said fault data corresponding to a condition of said network resource.

17. The method of claim 16 further comprising automatically transmitting said fault data received from said fault diagnosis system to said identified network users.

18. The method of claim 17 further comprising automatically providing said fault data to a fault impact notification module.

19. The method of claim 18, wherein said fault impact notification module identifies a network user as being affected by said result if said condition of said network resource may affect the network user's use of said network.

20. The method of claim 17 further comprising detecting by said fault diagnosis system a condition corresponding to a correction of a fault and communicating said fault correction from said fault diagnosis system to a fault impact notification module.

21. The method of claim 20 further comprising automatically sending an unsolicited message notifying said identified network users about said fault correction.

22. The method of claim 20 further comprising notifying a network user about said fault correction after receiving a query from said network user.

23. The method of claim 20 further comprising notifying a network user about said fault correction after a network administrator requests a status of said fault from a network administrator interaction module.

24. The method of claim 15, wherein the network resource comprises at least one of a software component or a hardware component.

25. The method of claim 15, wherein said unsolicited message is at least one of a ticker-tape notification, an electronic mail message, or an update of a web page being viewed by a user.

26. The method of claim 15, wherein network users affected by said result are identified through an inferencing mechanism.

27. The method of claim 15, wherein at least one network user is not a help desk operator, help desk administrator, or network administrator.

28. A network management system including a help desk system to provide help desk support in connection with a network under management by said network management system, the network management system comprising:
a help desk system constructed and arranged to respond to a help desk submission to automatically initiate an investigation of a network resource and to automatically send an unsolicited message describing a result of said investigation to network users affected by said result;
a user interaction module of said help desk system constructed and arranged to receive said help desk submission from a network user, a portion of said help desk submission being associated with a network resource, and in response to receiving said help desk submission to automatically initiate an investigation request to investigate a condition of said network resource;
a fault diagnosis interaction module constructed and arranged to interface with said user interaction module to receive said investigation request therefrom, said fault diagnosis interaction module having an interface mechanism responsive to said investigation request to automatically send a fault isolation request to initiate an investigation of said condition of said network resource with a fault diagnosis system, said interface mechanism to receive a result of said fault isolation request from said fault diagnosis system, and said interface mechanism responsive to said receipt of said result to automatically send a fault impact request to determine a consequence of said result;
a fault impact notification module constructed and arranged to interface with said fault diagnosis interaction module to receive said fault impact request therefrom, said fault impact notification module responsive to said fault impact request to take an action to determine a consequence of said result on use of said network by at least one network user; and
a help desk notification module constructed and arranged to receive a notification of a condition of said network resource having an effect on a at least one user's use of said network from said fault impact notification module and arranged to automatically send an unsolicited message to said user without using one of a help desk operator, a help desk administrator, or a network administrator, wherein the unsolicited message includes information enabling the user to verify the condition of the network resource included in the result of the fault isolation request.

29. The network management system of claim 28 wherein said fault diagnosis system is constructed to first detect a condition of a network resource and then provide said fault data to said fault diagnosis interaction module based on said condition.

30. The network management system of claim 28, wherein the information enabling the user to verify the condition of the network resource included in the result of the fault isolation request includes an identification of a process and/or a step used to identify the condition of the network resource included in the result of the fault isolation request.

31. The network management system of claim 28 comprising a network administrator interaction module constructed and arranged to provide data to a help desk administrator.

32. The network management system of claim 28 comprising a group administrator module constructed and arranged to provide data designated to users based on a selected user characteristic.

33. The network management system of claim 32, wherein said user characteristic used by said group administrator module is an IP address.

34. The network management system of claim 32, wherein said user characteristic used by said group administrator module is a type of a software agent running on a user system.

35. The network management system of claim 32 comprising a group membership database files providing data to said group administrator module.

36. The network management system of claim 28, wherein the network resource comprises at least one of a software component or a hardware component.

37. The network management system of claim 28, wherein said unsolicited message is at least one of a ticker-tape notification, an electronic mail message, or an update of a web page being viewed by a user.

38. The network management system of claim 28, wherein the at least one user is identified through an inferencing mechanism.

39. The network management system of claim 28, wherein at least one network user is not a help desk operator, help desk administrator, or network administrator.

* * * * *